United States Patent
Yen et al.

(10) Patent No.: US 9,158,931 B2
(45) Date of Patent: Oct. 13, 2015

(54) BLOCK ENCRYPTION METHOD AND BLOCK DECRYPTION METHOD HAVING INTEGRITY VERIFICATION

(71) Applicant: Institute For Information Industry, Taipei (TW)

(72) Inventors: Sung-Ming Yen, Taipei (TW); Jheng-Hong Tu, Kaohsiung (TW); Jui-Ming Wu, New Taipei (TW)

(73) Assignee: Institute For Information Industry, Taipei (TW)

( * ) Notice: Subject to any disclaimer, the term of this patent is extended or adjusted under 35 U.S.C. 154(b) by 74 days.

(21) Appl. No.: 14/187,292

(22) Filed: Feb. 23, 2014

(65) Prior Publication Data

US 2015/0149771 A1     May 28, 2015

(30) Foreign Application Priority Data

Nov. 27, 2013    (CN) .......................... 2013 1 0613143

(51) Int. Cl.
    *G06F 21/60*      (2013.01)
    *G06F 21/62*      (2013.01)
    *H04L 9/06*      (2006.01)

(52) U.S. Cl.
    CPC .......... *G06F 21/6209* (2013.01); *H04L 9/0618* (2013.01); *H04L 9/0637* (2013.01)

(58) Field of Classification Search
None
See application file for complete search history.

(56) References Cited

U.S. PATENT DOCUMENTS

| | | | |
|---|---|---|---|
| 6,973,187 B2 * | 12/2005 | Gligor et al. | ..................... 380/28 |
| 7,046,802 B2 | 5/2006 | Rogaway | |
| 7,200,227 B2 | 4/2007 | Rogaway | |
| 7,949,129 B2 | 5/2011 | Rogaway | |
| 8,321,675 B2 | 11/2012 | Rogaway | |
| 2013/0077780 A1 | 3/2013 | Rogaway | |

* cited by examiner

*Primary Examiner* — Kaveh Abrishamkar
*Assistant Examiner* — Tri Tran
(74) *Attorney, Agent, or Firm* — Skaar Ulbrich Macari, P.A.

(57) ABSTRACT

An encryption method and decryption method are provided. The encryption method divides an electronic file into a plurality of message blocks, wherein the message blocks have a sequence. The encryption method sets a checking vector as the last message block. The encryption method performs the following steps on each message block according to the sequence: generating an input block, deriving an output block by encrypting the input block by an encryption key, and deriving an encrypted block by applying XOR operation to the output block and the previous message block, wherein the input block is equivalent to applying XOR operation to the message block, the output block corresponding to the previous message block, and the message block before the previous one. The encryption method generates an electronic encrypted file by concatenating the encrypted blocks. The decryption method performs a series of operations corresponding to the above operations.

16 Claims, 20 Drawing Sheets

BLOCK ENCRYPTION METHOD AND BLOCK DECRYPTION METHOD HAVING INTEGRITY VERIFICATION

PRIORITY

This application claims priority to China Patent Application No. 201310613143.5 filed on Nov. 27, 2013, which is hereby incorporated by reference in its entirety.

FIELD

The present invention relates to a block encryption method and a block decryption method. More particularly, the present invention relates to a block encryption method and a block decryption method having integrity verification.

BACKGROUND

In one-on-one secure communications, a message can be transmitted securely only when confidentiality, integrity, and source authentication are all satisfied during the communication. The confidentiality means that the contents of the message will not be obtained by a third party during the transmission. The integrity means that the message receiving party must be able to ensure that the received message contents are consistent with the message contents transmitted by the transmitting party, i.e., the message contents are not tampered. The source authentication means that the message receiving party must be able to authenticate that the message is indeed transmitted by the expected transmitting party.

In network communications, a symmetric encryption/decryption method is usually used as a mechanism of the secure communication. The transmitting party and the receiving party reach an agreement on a key in advance and then the transmitting party encrypts the message to be transmitted into an encrypted file by using the key and a symmetric encryption algorithm. After receiving the encrypted file, the receiving party decrypts the encrypted file by using the same key and a symmetric decryption algorithm corresponding to the symmetric encryption algorithm so as to obtain the message transmitted by the transmitting party previously.

If the data size of the message to be encrypted by the transmitting party is greater than one block that can be processed by the symmetric encryption algorithm, a block operation mode must be adopted together. The block operation mode is adopted to connect individual message blocks in a safe way to protect some message blocks from being revealed or being additionally attacked. A cipher block chaining (CBC) mode is one of the block operation modes, the encryption mechanism and the decryption mechanism of which are respectively shown in FIGS. 1A and 1B.

As shown in FIG. 1A, the encryption mechanism of the CBC mode is to divide the electronic file M to be transmitted into a plurality of message blocks $m_1, m_2, m_3, m_4, \ldots, m_t$ of the same size and perform encryption on each of the message blocks $m_1, m_2, m_3, m_4, \ldots, m_t$ individually. Specifically, for the first one of the message blocks (i.e., the message block $m_1$), the encryption mechanism firstly performs an exclusive OR (XOR) operation on the message block $m_1$ and an initial vector IV and then performs an encryption operation E on the result of the XOR operation by using the symmetric encryption algorithm and a key K so as to generate an encrypted block $c_1$ corresponding to the message block $m_1$. For each of the other message blocks (i.e., the message blocks $m_2, m_3, m_4, \ldots, m_t$), the encryption mechanism firstly performs the XOR operation on the message block and an encrypted block corresponding to a previous message block thereof (i.e., encrypted blocks $c_1, c_2, c_3, c_4, \ldots, c_{t-1}$) and then performs the encryption operation E on the result of the XOR operation by using the symmetric encryption algorithm and the same key K so as to generate an encrypted block (i.e., encrypted blocks $c_2, c_3, c_4, \ldots, c_t$). Finally, the encryption mechanism concatenates the encrypted blocks $c_1, c_2, c_3, \ldots, c_t$ to generate an electronic encrypted file C.

As shown in FIG. 1B, the decryption mechanism of the CBC mode divides the electronic encrypted file C received into a plurality of encrypted blocks $c_1, c_2, c_3, c_4, \ldots, c_t$ of the same size and performs decryption on each of the encrypted blocks $c_1, c_2, c_3, c_4, \ldots, c_t$ individually. Specifically, for the first one of the encrypted blocks (i.e., the encrypted block $c_1$), the decryption mechanism firstly performs a decryption operation D by using a symmetric decryption algorithm corresponding to the symmetric encryption algorithm and the same key K and then performs an XOR operation on the decryption result and the initial vector IV so as to generate the message block $m_1$ corresponding to the encrypted block $c_1$. For each of the other encrypted blocks (i.e., the encrypted blocks $c_2, c_3, c_4, \ldots, c_t$), the decryption mechanism also firstly performs the decryption operation D by using the symmetric decryption algorithm and the same key K and then performs an XOR operation on the decryption result and a previous encrypted block thereof (i.e., the encrypted blocks $c_1, c_2, c_3, c_4, \ldots, c_{t-1}$) so as to generate a message block (i.e., the message blocks $m_2, m_3, m_4, \ldots, m_t$). Finally, the decryption mechanism generates the electronic file M by concatenating the message blocks $m_1, m_2, m_3, \ldots, m_t$.

The symmetric encryption/decryption algorithm can satisfy the requirements of the aforesaid confidentiality but can not satisfy the requirements of the integrity. Specifically, even if the electronic encrypted file is tampered by an attacker, the receiving party can still perform the decryption operation on the tampered electronic encrypted file after receiving it. For example, if the aforesaid electronic encrypted file C (which comprises the encrypted blocks $c_1, c_2, c_3, \ldots, c_t$) is tampered into an electronic encrypted file C' (which comprises encrypted blocks $c_1', c_2, c_3, \ldots, c_t$) by the attacker, the receiving party can still decrypts the electronic encrypted file C' into an electronic file M' (which comprises message blocks $m_1', m_2', m_3, m_4, \ldots, m_t$), as shown in FIG. 1C. However, in most cases, the receiving party can not determine whether the message obtained by decryption (e.g., the electronic file M') is true. Especially when the message that would be transmitted by the transmitting party is a program or a message that can not be recognized by the server or the people, the receiving party can not be aware of any abnormity of the message obtained by decrypting the tampered electronic encrypted file.

If the security requirements for integrity can not be achieved, then the source authentication can not be satisfied as a consequence. Specifically, the attacker may select any random number as the electronic encrypted file and transmit it to the receiving party by personating the transmitting party. The receiving party will decrypt the electronic encrypted file received (i.e., the random number selected by the attacker) into a plain text by using the key and the symmetric decryption algorithm. The receiving party can not be aware of any abnormity of the electronic encrypted file received and the plain text obtained by decryption because the receiving party is not able to perform the integrity verification. The main reason is that the key is owned by both the transmitting party and the receiving party, so the receiving party will consider the plain text obtained by decryption as being transmitted by the transmitting party although, actually, the electronic encrypted file is transmitted by the attacker. As can be known from this, the source cannot be authenticated in cases where the integrity requirements cannot be satisfied by the symmetric encryption/decryption algorithm.

As a solution to the aforesaid problem, a plurality of methods may be adopted. For example, a solution in which the transmission is performed by adopting the secure sockets layer (SSL)/transport layer security (TLS) mechanism is shown in FIG. 1D. The transmitting party and the receiving party reach an agreement on two keys K and $K_m$ in advance. When the transmitting party wants to transmit an electronic file $M_S$ to the receiving party, the transmitting party firstly performs a message authentication code (MAC) operation MAC on the electronic file $M_S$ by using the key $K_m$ to generate a message authentication code $z_1$. Then, the transmitting party concatenates the electronic file $M_S$ and message authentication code $z_1$ and performs an encryption operation E on the concatenation result by using the symmetric encryption algorithm and the key K to generate an electronic encrypted file $C_N$. After receiving the electronic encrypted file $C_N$, the receiving party firstly performs a decryption operation D by using the symmetric decryption algorithm and the key K and obtains an electronic file $M_D$ and a message authentication code $z_2$. Then, the receiving party performs the message authentication code operation MAC on the electronic file $M_D$ by using the key $K_m$ to generate a message authentication code $z_3$. Subsequently, the receiving party performs a comparing operation CMP on the message authentication code $z_3$ and the message authentication code $z_2$ obtained by decryption. If the result of the comparing operation CMP is that the message authentication code $z_3$ is the same as the message authentication code $z_2$, it indicates that the electronic file $M_D$ is not tampered during the communication and is consistent with the contents of the electronic file $M_S$ transmitted by the transmitting party. However, if the result of the comparing operation CMP is that the message authentication code $z_3$ is different from the message authentication code $z_2$, it indicates that the electronic file $M_D$ obtained by decryption has been tampered during the communication.

The "MAC-then-encrypt" method adopted by the aforesaid SSL/TLS mechanism is capable of satisfying the three basic security requirements of confidentiality, integrity and source authentication simultaneously because an agreement has been reached on the two keys K and $K_m$ in advance. A plurality of methods of calculating the message authentication code is available in the conventional art. A common method is to use a keyed-hash message authentication code (HMAC) created by a hash function. Another method is to use a cipher block chaining message authentication code in combination with the CBC mode (CBC-MAC). The calculating efficiency of the HMAC is determined by the hash function adopted. To satisfy the security requirements, the hash algorithms usually adopted are SHA-1, SHA-2 and the like. However, the calculating efficiencies of these relatively complex hash algorithms are quite approximate to that of the common advanced encryption standard (AES). On the other hand, in terms of the CBC-MAC, although only the last block of the encrypted file is used as the output, the entire input data is encrypted once during the calculating process. In other words, the calculating efficiency of the CBC-MAC is equivalent to that of the block encryption algorithm adopted.

Accordingly, when the MAC-then-encrypt method is adopted, the calculating time to be taken is double that would be taken when the message authentication code is not adopted. The extra time is taken to calculate the message authentication code. When the message to be encrypted has a very large data size, the doubled time to be taken is still a non-ignorable burden for general applications. Accordingly, an urgent need exists in the art to provide a solution capable of reducing the time cost while satisfying the three basic security requirements of confidentiality, integrity and source authentication.

SUMMARY

To solve the aforesaid problem, the present invention, in certain embodiments, provides a block encryption method and a block decryption apparatus having integrity verification.

The block encryption method of certain embodiments of the present invention is implemented by a computer. The block encryption method comprises the following steps of: (a) obtaining a first vector and a second vector, (b) dividing an electronic file into a plurality of encrypted blocks, wherein the encrypted blocks have a sequence, and (c) adding a checking vector into the message blocks as the last one of the message blocks. The block encryption method further comprises step (d), which performs the following operations on each of the message blocks according to the sequence: (d1) generating an input block, wherein a value of the input block is equal to a value obtained by performing an exclusive OR (XOR) operation on the message block, an output block corresponding to a previous message block of the message block and a message block before the previous message block of the message block, (d2) encrypting the input block by using a key to obtain an output block, and (d3) performing an XOR operation on the output block and the previous message block of the message block to obtain an encrypted block. The output block corresponding to the previous message block of the message block is the first vector and the message block before the previous message block of the message block is an all-zero vector when the step (d) processes the first one of the message blocks, and the message block before the previous message block of the message block is the second vector when the step (d) processes the second one of the message blocks. The block encryption method further comprises step (e), which concatenates the encrypted blocks according to the sequence to generate an electronic encrypted file.

The block decryption method of certain embodiments of the present invention is implemented by a computer. The block decryption method comprises the following steps of: (a) obtaining a first vector and a second vector, and (b) dividing an electronic encrypted file into a plurality of encrypted blocks, wherein the encrypted blocks have a sequence. The block decryption method further comprises step (c), which performs the following operations on each of the encrypted blocks according to the sequence: (c1) generating an input block, wherein a value of the input block is equal to a value obtained by performing an XOR operation on the encrypted block, an output block corresponding to a previous encrypted block of the encrypted block and an encrypted block before the previous encrypted block of the encrypted block, (c2) decrypting the input block by using a key to obtain an output block, and (c3) generating a message block, wherein a value of the message block is equal to a value obtained by performing an XOR operation on the output block and the previous encrypted block of the encrypted block. The output block corresponding to the previous encrypted block of the encrypted block is the second vector and the encrypted block before the previous encrypted block of the encrypted block is an all-zero vector when the step (c) processes the first one of the encrypted blocks, and the encrypted block before the previous encrypted block of the encrypted block is the first vector when the step (c) processes the second one of the encrypted blocks. The block decryption method further comprises the following steps of: (d) comparing the last one of the message blocks with a checking vector, and (e) concatenating the message blocks excluding the last one of the message blocks according to the sequence to generate a decrypted file when the last one of the message blocks is the same as the checking vector.

Another block decryption method of certain embodiments of the present invention is implemented by a computer. The block decryption method comprises the following steps of: (a) obtaining a first vector and a second vector, (b) dividing an electronic encrypted file into a plurality of encrypted blocks, wherein the encrypted blocks have a first sequence and the last one of the encrypted blocks is a reference vector, (c) excluding the last one of the encrypted blocks, (d) re-arranging the encrypted blocks according to a second sequence after the step (c), wherein the second sequence is reverse to the first sequence, and (e) adding the first vector into the encrypted blocks as the last one of the encrypted blocks. The block decryption method further comprises step (f), which performs the following operations on each of the encrypted blocks according to the second sequence: (f1) generating an input block, wherein a value of the input block is equal to a value obtained by performing an XOR operation on the encrypted block, an output block corresponding to a previous encrypted block of the encrypted block, and an encrypted block before the previous encrypted block of the encrypted block, (f2) encrypting the input block by using a key to obtain an output block, and (f3) generating a message block by performing an XOR operation on the output block and the previous encrypted block of the encrypted block. The output block corresponding to the previous encrypted block of the encrypted block is the checking vector and the encrypted block before the previous block of the encrypted block is an all-zero vector when the step (f1) processes the first one of the encrypted blocks, and the encrypted block before the previous encrypted block of the encrypted block is the reference vector when the step (f1) processes the second one of the encrypted blocks. The block decryption method further comprises the following steps of: (g) comparing the last one of the message blocks with the second vector, and (h) when the last one of the message blocks is the same as the second vector, excluding the last one of the message blocks and then concatenating the other message blocks according to the second sequence to generate a decrypted file.

The block encryption method of certain embodiments of the present invention associate a plurality of message blocks comprised in the electronic file with a plurality of encrypted blocks comprised in the electronic encrypted file in multiple levels. In this way, if any one of the encrypted blocks of the electronic encrypted file is tampered (or is falsely transmitted), then the contents of the last one of the message blocks obtained by the decryption apparatus and method through decrypting the electronic encrypted file are false. As what the last one of the message blocks should be can be known, the decryption method can be aware that the integrity of the electronic encrypted file has been damaged and thus discard the electronic encrypted file. Accordingly, the technology disclosed by the present invention can accomplish the encryption and the decryption efficiently without performing the message authentication code operation, while still satisfying the three basic security requirements of confidentiality, integrity and source authentication.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the block encryption apparatus, the block encryption method, the block decryption apparatus, and the block decryption method having integrity verification provided by the present invention will be explained with reference to example embodiments thereof. However, these example embodiments are not intended to limit the present invention to any specific examples, embodiments, environment, applications or particular implementations described in these embodiments. Therefore, description of these example embodiments is only for purpose of illustration rather than to limit the present invention. It should be appreciated that, in the following embodiments and the attached drawings, elements unrelated to the present invention are omitted from depiction.

Figure 1A:
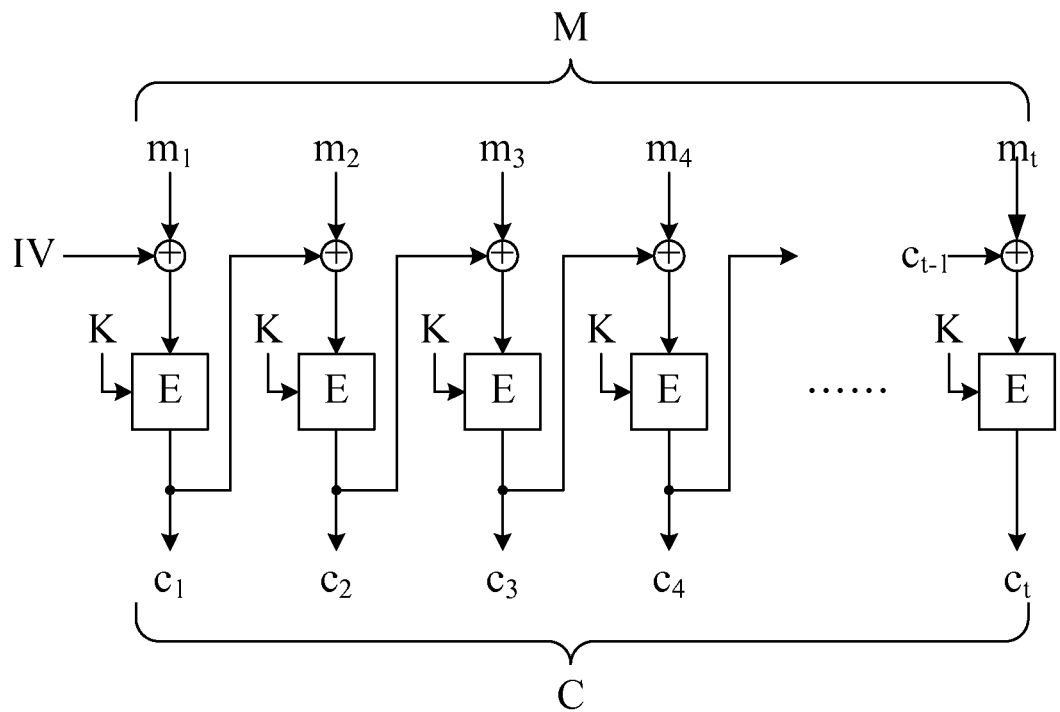
FIG. 1A is a schematic view depicting an encryption mechanism in a CBC mode.
Figure 1B:
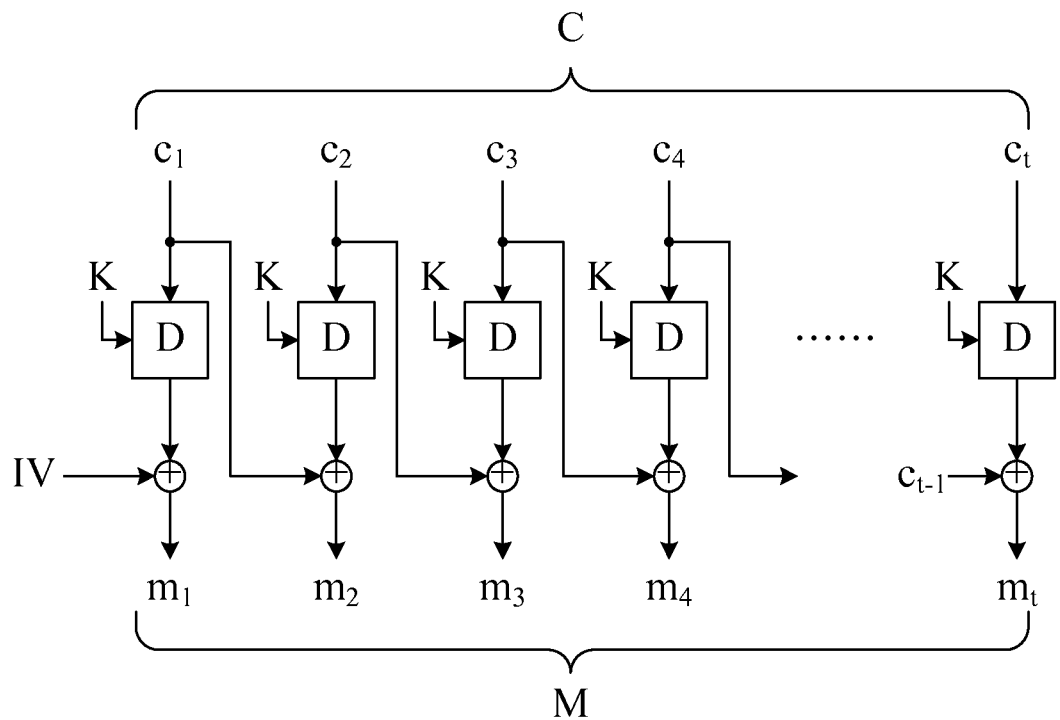
FIG. 1B is a schematic view depicting a decryption mechanism in a CBC mode.
Figure 1C:
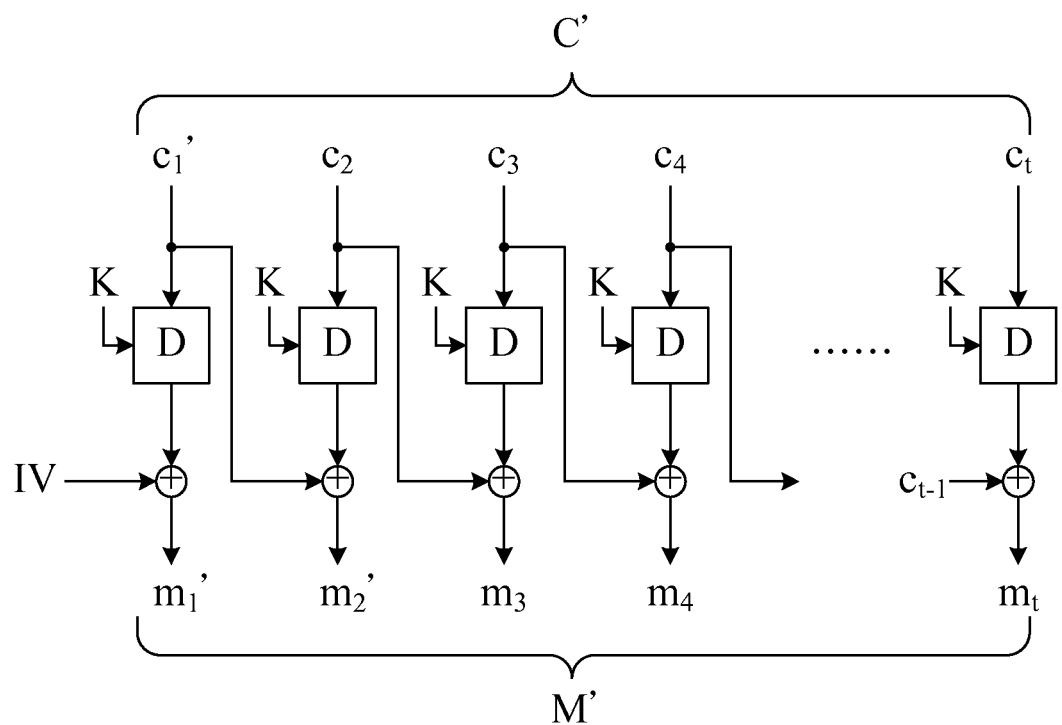
FIG. 1C illustrates a decryption result of a tampered electronic encrypted file under the CBC mode.
Figure 1D:
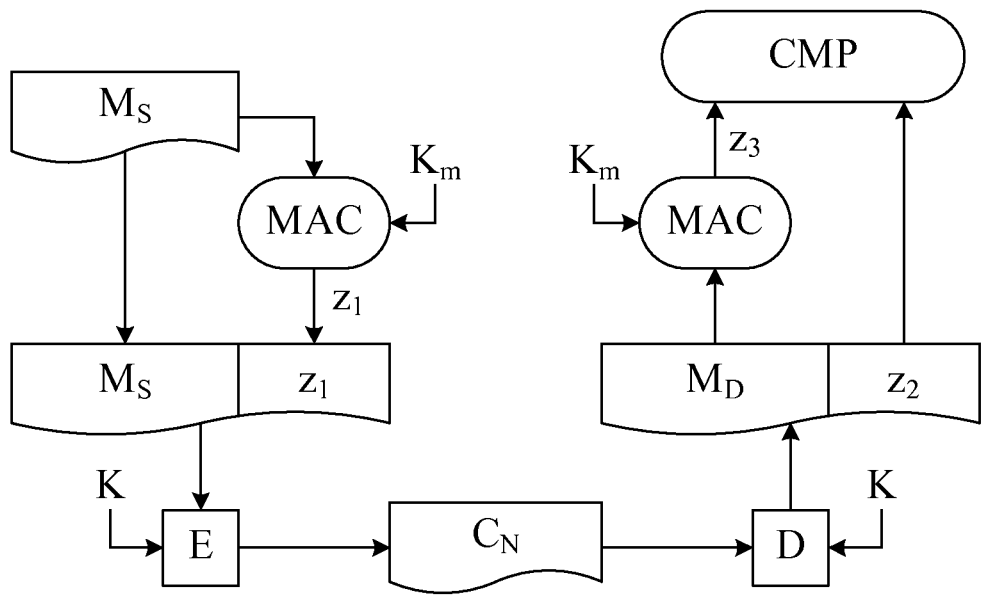
FIG. 1D is a schematic view depicting the "message authentication code-then-encrypt" mechanism.

Please refer to FIG. 1C firstly. In the conventional art, if an encrypted block $c_1$ of an electronic encrypted file C is tampered (or falsely transmitted) into an encrypted block $c_1'$, then message blocks $m_1'$ and $m_2'$ comprised in an electronic file M' into which an electronic encrypted file C' is decrypted by the receiving party are false. In general block encryption applications, the message blocks obtained by decryption being false indicates that the integrity has been damaged and, theoretically, the message obtained by decryption is unacceptable. In the conventional art, smaller error diffusivity is more advantageous to stream encryption in an encryption method based on block encryption.

In the present invention, a new block operation mode is adopted to maximize the influence of the error diffusion while still keeping the characteristics of the original block operation mode. Under this new block operation mode, the last one of the message blocks obtained by decryption will be false if the electronic encrypted file is tampered (or falsely transmitted). In this way, if the receiving party knows what the last one of the message blocks should be in advance, the receiving party can be aware that the integrity of the electronic encrypted file has been damaged and thus discard the electronic encrypted file.

Figure 2A:
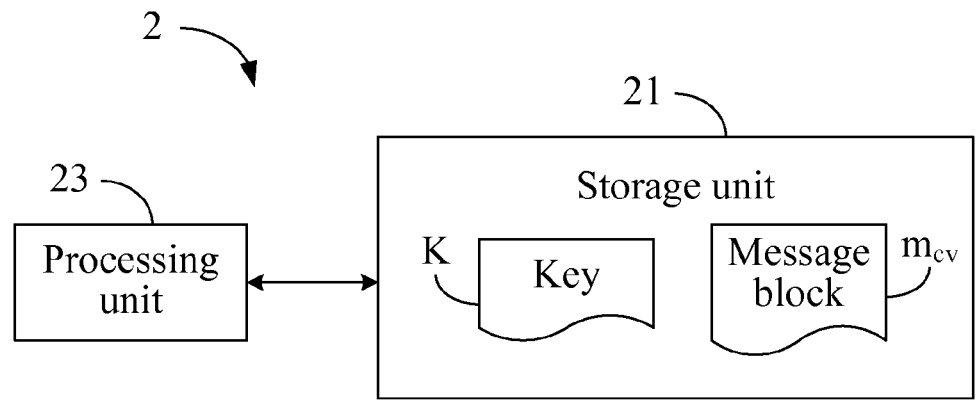
FIG. 2A is a schematic view depicting an architecture according to a first and a second embodiment of the present invention.
Figure 2B:
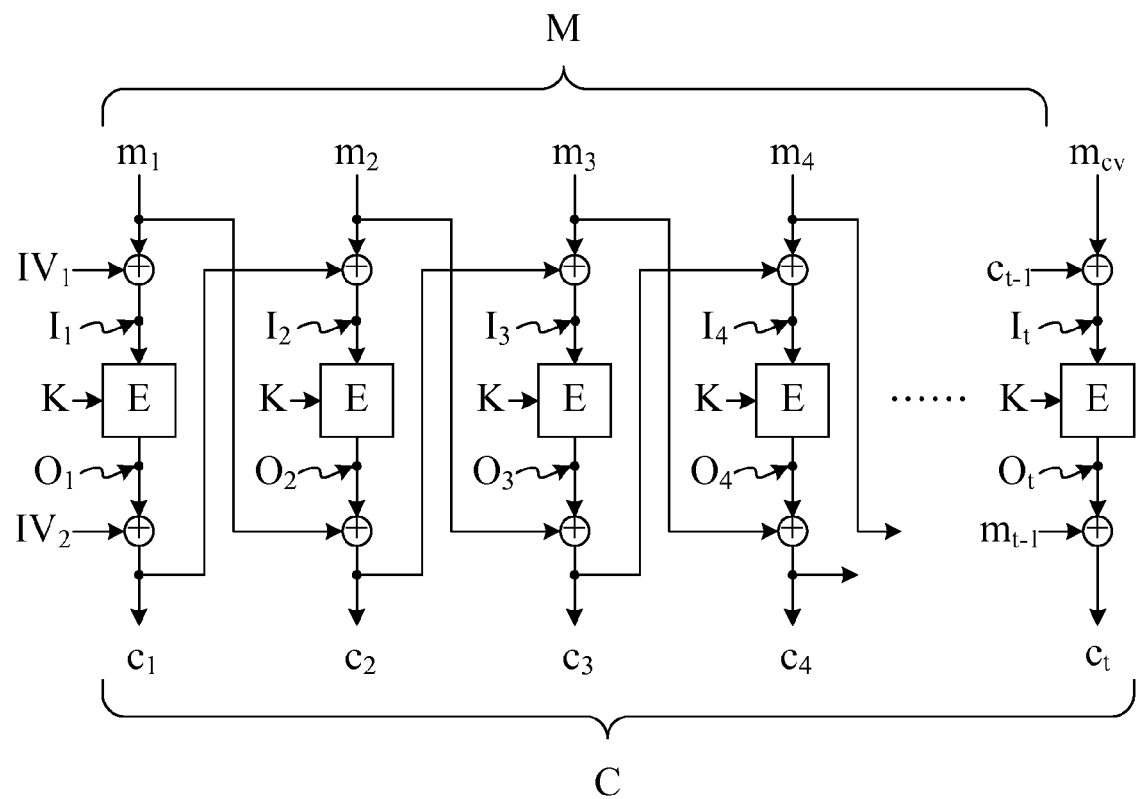
FIG. 2B is a schematic view depicting encryption operations according to the first embodiment of the present invention.

A first embodiment of the present invention is a block encryption apparatus 2, a schematic view depicting an architecture of which is shown in FIG. 2A, and a schematic view depicting encryption operations of which is shown in FIG. 2B. The block encryption apparatus 2 comprises a storage unit 21 and a processing unit 23 which electrically connect with each other. The storage unit 21 may be a memory, a floppy disk, a hard disk, a compact disk (CD), a mobile disk, a magnetic tape, a database, or any other storage media or circuit with the same function and well known to those of ordinary skill in the art. The processing unit 23 may be any of various processors, central processing units (CPUs), microprocessors or other computing apparatuses known to those of ordinary skill in the art.

The storage unit 21 is stored with a key K and a message block $m_{cv}$. The message block $m_{cv}$ is used as a checking vector. The processing unit 23 obtains a first vector $IV_1$ and a second vector $IV_2$. The processing unit 23 divides an electronic file M to be encrypted into a plurality of message blocks $m_1, m_2, m_3, m_4, \ldots, m_{t-1}$ firstly. The message blocks $m_1, m_2, m_3, m_4, \ldots, m_{t-1}$ have a sequence (i.e., in an order of message blocks $m_1, m_2, m_3, m_4, \ldots, m_{t-1}$). It should be appreciated that, the electronic file M may be stored in the storage unit 21. Alternatively, if the block encryption apparatus 2 is further provided with an input interface, the electronic file M may be received by the input interface from the external. Furthermore, the processing unit 23 adds the message block $m_{cv}$ into these message blocks as the last one of the message blocks. In other words, the processing unit 23 will process the message blocks $m_1, m_2, m_3, m_4, \ldots, m_{t-1}, m_{cv}$ subsequently.

Then, the processing unit 23 performs the following operations on each of the message blocks $m_1, m_2, m_3, m_4, \ldots, m_{t-1}, m_{cv}$ according to the sequence: generating an input block, encrypting the input block by using a key to obtain an output block, and performing an exclusive OR (XOR) operation on the output block and a previous message block of the message block to obtain an encrypted block. It should be appreciated that, when each of the message blocks $m_1, m_2, m_3, m_4, \ldots, m_{t-1}, m_{cv}$ is processed, a value of the input block is equal to a value obtained by performing an XOR operation on the message block, an output block corresponding to the previous message block of the message block and a message block before the previous message block of the message block, as expressed by the following Equation (1):

$$I[i]=m[i]\ominus O[i-1]\ominus m[i-2] \quad (1)$$

In the above Equation (1), the variable i represents a serial number of the message block being processed, $I[i]$ represents the $i^{-th}$ input block, $O[i-1]$ represents the $i-1^{-th}$ output block, $m[i]$ represents the $i^{-th}$ message block, $m[i-2]$ represents the $i-2^{-th}$ message block, and the symbol $\ominus$ represents an XOR operation. It should be appreciated that, when the first one of the message blocks (i.e., the message block $m_1$) is processed by the processing unit 23, the output block corresponding to the previous message block of the message block $m_1$ is the first vector $IV_1$ (i.e., the value of $O[0]$ is equal to that of the first vector $IV_1$) and the message block before the previous message block of the message block $m_1$ is an all-zero vector (i.e., $m[-1]=0$). When the second one of the message blocks (i.e., the message block $m_2$) is processed by the processing unit 23, the message block before the previous message block of the message block $m_2$ is the second vector $IV_2$ (i.e., the value of $m[0]$ is equal to that of the second vector $IV_2$).

In this embodiment, the processing unit 23 generates the input block by performing an XOR operation on the message block and the encrypted block corresponding to the previous message block of the message block. This is expressed by the following Equation (2), where $c[i-1]$ represents the $i-1^{-th}$ encrypted block:

$$I[i] = m[i] \oplus c[i-1] \quad (2)$$
$$= m[i] \oplus O[i-1] \oplus m[i-2]$$

How each of the input blocks, the output blocks and the encrypted blocks is generated will be further detailed now. Specifically, for the first one of the message blocks (i.e., the message block $m_1$), the processing unit 23 firstly performs an XOR operation on the message block $m_1$ and the encrypted block corresponding to a previous message block to obtain an input block $I_1$. The processing unit 23 takes the value of the first vector $IV_1$ as the value of the encrypted block corresponding to the previous message block of the message block $m_1$. Then, the processing unit 23 performs an encryption operation E on the input block $I_1$ by using the key K and a symmetric encryption algorithm to obtain an output block $O_1$. Afterwards, the processing unit 23 performs an XOR operation on the output block $O_1$ and the previous message block of the message block $m_1$ to obtain an encrypted block $c_1$. The processing unit 23 takes the value of the second vector $IV_2$ as the value of the previous message block of the message block $m_1$. In other words, the processing unit 23 performs an XOR operation on the output block $O_1$ and the second vector $IV_2$ to obtain an encrypted block $c_1$.

Afterwards, for the rest of the message blocks (i.e., the message blocks $m_2, m_3, m_4, \ldots, m_{cv}$), the processing unit 23 firstly performs an XOR operation on each of the message blocks $m_2, m_3, m_4, \ldots, m_{cv}$ and an encrypted block corresponding to a previous message block thereof respectively (i.e., encrypted blocks $c_1, c_2, c_3, \ldots, c_{t-1}$) to obtain input blocks $I_2, I_3, I_4, \ldots, I_t$; performs an encryption operation E on each of the input blocks $I_2, I_3, I_4, \ldots, I_t$ by using the key K and the same symmetric encryption algorithm to obtain output blocks $O_2, O_3, O_4, \ldots O_t$ respectively; and then performs an XOR operation on each of the output blocks $O_2, O_3, O_4, \ldots O_t$ and a previous message block thereof (i.e., the message blocks $m_1, m_2, m_3, \ldots, m_{t-1}$) to obtain encrypted blocks $c_2, c_3, c_4, \ldots, c_t$ respectively.

Afterwards, the processing unit 23 concatenates the encrypted blocks $c_1, c_2, c_3, c_4, \ldots, c_t$ according to the sequence to generate an electronic encrypted file C. The block encryption apparatus 2 may transmit the electronic encrypted file C to the receiving party via some other transmission interface. Alternatively, if the block encryption apparatus 2 is further provided with a transmission interface, the electronic encrypted file C may also be transmitted to the receiving party via this transmission interface.

Figure 2C:
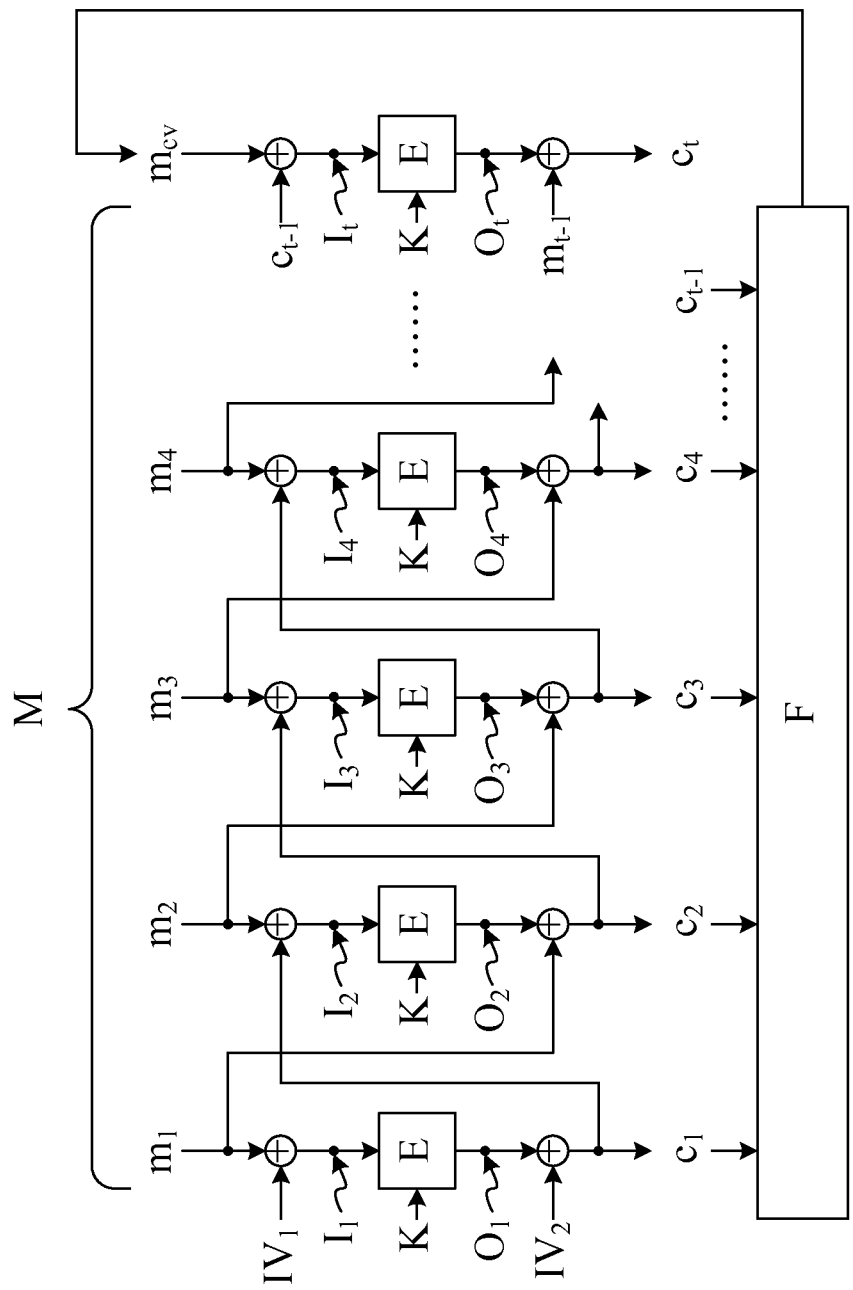
FIG. 2C is a schematic view depicting how a message block $m_{c_v}$ is generated.

It should be appreciated that, in other implementations, the storage unit 21 of the block encryption apparatus 2 may not be stored with the message block $m_{cv}$. In these implementations, the processing unit 23 performs an operation F on the encrypted blocks $c_1, c_2, c_3, c_4, \ldots, c_{t-1}$ after the encrypted blocks $c_1, c_2, c_3, c_4, \ldots, c_{t-1}$ are obtained and before the last one of the message blocks (i.e., the message block $m_{cv}$) is processed and takes the result of the operation as the message block $m_{cv}$, as shown in FIG. 2C. For example, the processing unit 23 may perform an XOR operation on the encrypted blocks $c_1, c_2, c_3, c_4, \ldots, c_{t-1}$ to obtain a temporary block and then perform a function operation on the temporary block to obtain the message block $m_{cv}$. The aforesaid function operation may be a key encrypting operation, a rotation operation, a hash operation or any other function operation on which an agreement has been reached in advance with the decryption side. Since the processing unit 23 generates the message block $m_{cv}$ by using the encrypted blocks $c_1, c_2, c_3, c_4, \ldots, c_{t-1}$ in these implementations, an attack caused by the attacker tampering the last encrypted block $c_t$ can be avoided.

As can be known from the above descriptions, in addition to associating the encrypted blocks $c_1, c_2, c_3, \ldots, c_{t-1}$ with the message blocks $m_2, m_3, m_4, \ldots, m_{cv}$ respectively, the block encryption apparatus 2 further associates the message blocks $m_1, m_2, m_3, \ldots, m_{t-1}$ with the encrypted blocks $c_2, c_3, c_4, \ldots, c_t$ respectively. Therefore, if any one of the encrypted blocks $c_1, c_2, c_3, c_4, \ldots, c_t$ of the electronic encrypted file C is tampered (or falsely transmitted), the last one of the message blocks obtained by decrypting the electronic encrypted file C by the decryption apparatus (which will be detailed hereinafter) used together with the block encryption apparatus 2 will be false. As what the last one of the message blocks should be is also known, the decryption apparatus can be aware that the integrity of the electronic encrypted file C has been damaged accordingly and thus discard the electronic encrypted file. Moreover, if the block encryption apparatus 2 further uses the encrypted blocks $c_1, c_2, c_3, c_4, \ldots, c_{t-1}$ to generate the message block $m_{cv}$ as the checking vector, the attack caused by the attacker tampering the last one of the encrypted blocks can be avoided.

As can be known from this, with the technology of this embodiment, the block encryption apparatus 2 can satisfy the three basic security requirements of confidentiality, integrity and source authentication in cases where the message authentication code operation is not performed. Therefore, the block encryption apparatus 2 can satisfy the three basic security requirements of confidentiality, integrity and source authentication in an efficient way by adopting the technology of this embodiment.

Figure 3A:
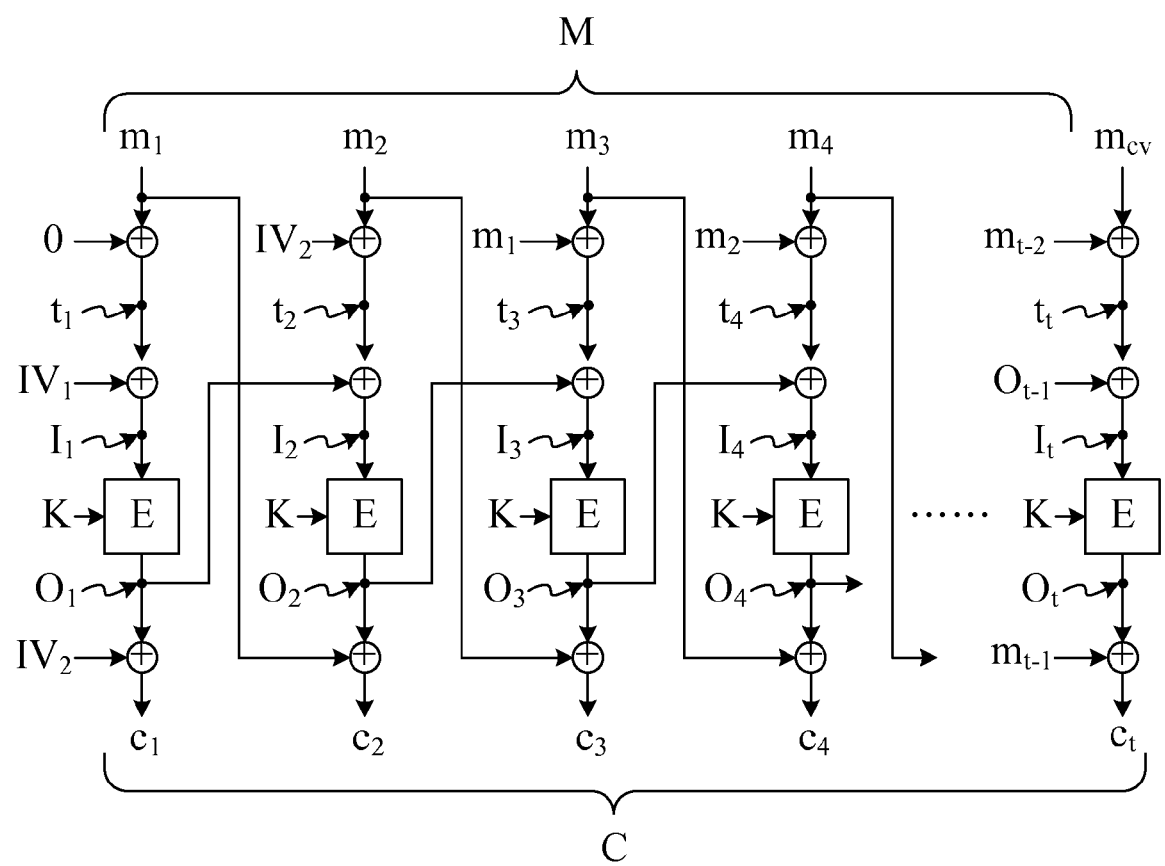
FIG. 3A is a schematic view depicting encryption operations according to the second embodiment of the present invention.

A second embodiment of the present invention is shown in FIGS. 2A and 3A. FIG. 3A is a schematic view depicting encryption operations. Most operations of the second embodiment are similar to those of the first embodiment, and only differences between the second embodiment and the first embodiment will be detailed hereinafter.

Similarly, the processing unit 23 divides an electronic file M to be encrypted into a plurality of message blocks $m_1, m_2, m_3, m_4, \ldots, m_{t-1}$. The message blocks $m_1, m_2, m_3, m_4, \ldots, m_{t-1}$ have a sequence (i.e., in an order of message blocks $m_1, m_2, m_3, m_4, \ldots, m_{t-1}$). Furthermore, the processing unit 23 also adds the message block $m_{cv}$ into the message blocks. In other words, the processing unit 23 will process the message blocks $m_1, m_2, m_3, m_4, \ldots, m_{t-1}, m_{cv}$ subsequently.

Then, the processing unit 23 performs the following operations on each of the message blocks $m_1, m_2, m_3, m_4, \ldots, m_{cv}$ according to the sequence: generating an input block, encrypting the input block by using a key to obtain an output block, and performing an XOR operation on the output block and a previous message block of the message block to obtain an encrypted block. It should be appreciated that, when each of the message blocks $m_1, m_2, m_3, m_4, \ldots, m_{t-1}, m_{cv}$ is processed, a value of the input block is equal to a value obtained by performing an XOR operation on the message block, an output block corresponding to the previous message block of the message block and a message block before the previous message block of the message block, as expressed by the aforesaid Equation (1).

In this embodiment, the processing unit 23 generates the input block by performing the following operations on each of the message blocks: performing an XOR operation on the message block and the message block before the previous message block of the message block to obtain a temporary block, and performing an XOR operation on the temporary block and the output block corresponding to the previous message block of the message block to obtain the input block. It should be appreciated that, when the first one of the message blocks (i.e., the message block $m_1$) is processed by the processing unit 23, the message block before the previous message block of the message block $m_1$ is an all-zero vector (i.e., $m[-1]=0$), and the output block corresponding to the previous message block of the message block $m_1$ is the first vector $IV_1$ (i.e., the value of $O[0]$ is equal to that of the first vector $IV_1$). When the second one of the message blocks (i.e., the message block $m_2$) is processed by the processing unit 23, the message block before the previous message block of the message block $m_2$ is the second vector $IV_2$ (i.e., the value of $m[0]$ is equal to that of the second vector $IV_2$).

How each of the input blocks, the output blocks and the encrypted blocks is generated will be further detailed now. Firstly, how the processing unit 23 processes the first one of the message blocks (i.e., the message block $m_1$) will be described. The processing unit 23 firstly performs an XOR operation on the message block $m_1$ and the message block before the previous message block thereof to obtain a temporary block $t_1$. The processing unit 23 takes the all-zero vector as the value of message block before the previous message block of the message block $m_1$. Then, the processing unit 23 performs an XOR operation on the temporary block $t_1$ and the output block corresponding to the previous message block of the message block $m_1$ to obtain an input block $I_1$. The processing unit 23 takes the value of the first vector $IV_1$ as the value of the output block corresponding to the previous message block of the message block $m_1$. Afterwards, the processing unit 23 encrypts the input block $I_1$ by using the key K and a symmetric encryption algorithm to obtain an output block $O_1$. Then, the processing unit 23 performs an XOR operation on the output block $O_1$ and the previous message block of the message block $m_1$ to obtain an encrypted block $c_1$. The processing unit 23 takes the second vector $IV_2$ as the previous message block of the message block $m_1$. In other words, the processing unit 23 performs an XOR operation on the output block $O_1$ and the second vector $IV_2$ to obtain an encrypted block $c_1$.

For the rest of the message blocks (i.e., the message blocks $m_2, m_3, m_4, \ldots, m_{cv}$), the processing unit 23 also firstly performs an XOR operation on each of the message blocks $m_2, m_3, m_4, \ldots, m_{cv}$ and a message block before a previous message block thereof respectively to obtain temporary blocks $t_2, t_3, t_4, \ldots, t_t$. It should be appreciated that, when the second one of all the message blocks (i.e., the message block $m_2$) is processed by the processing unit 23, the value of the second vector $IV_2$ is taken as the value of the message block before the previous message block of the message block $m_2$. Then, the processing unit 23 performs an XOR operation on each of the temporary blocks $t_2, t_3, t_4, \ldots, t_t$ and the output block corresponding to the previous message block thereof respectively to obtain input blocks $I_2, I_3, I_4, \ldots, I_t$.

Then, the processing unit 23 encrypts each of the input blocks $I_2, I_3, I_4, \ldots, I_t$ by using the key K and the symmetric encryption algorithm respectively to obtain output blocks $O_2, O_3, O_4, \ldots, O_t$. Afterwards, the processing unit 23 performs an XOR operation on each of the output blocks $O_2, O_3, O_4, \ldots, O_t$ and a previous message block $m_1, m_2, m_3, \ldots, m_{t-1}$ thereof respectively to obtain encrypted blocks $c_2, c_3, c_4, \ldots, c_t$.

Afterwards, the processing unit 23 concatenates the encrypted blocks $c_1, c_2, c_3, c_4, \ldots, c_t$ according to the sequence to generate an electronic encrypted file C. The block encryption apparatus 2 may transmit the electronic encrypted file C to the receiving party via some other transmission interface. Alternatively, if the block encryption apparatus 2 is further provided with a transmission interface, the electronic encrypted file C may also be transmitted to the receiving party via this transmission interface.

Figure 3B:
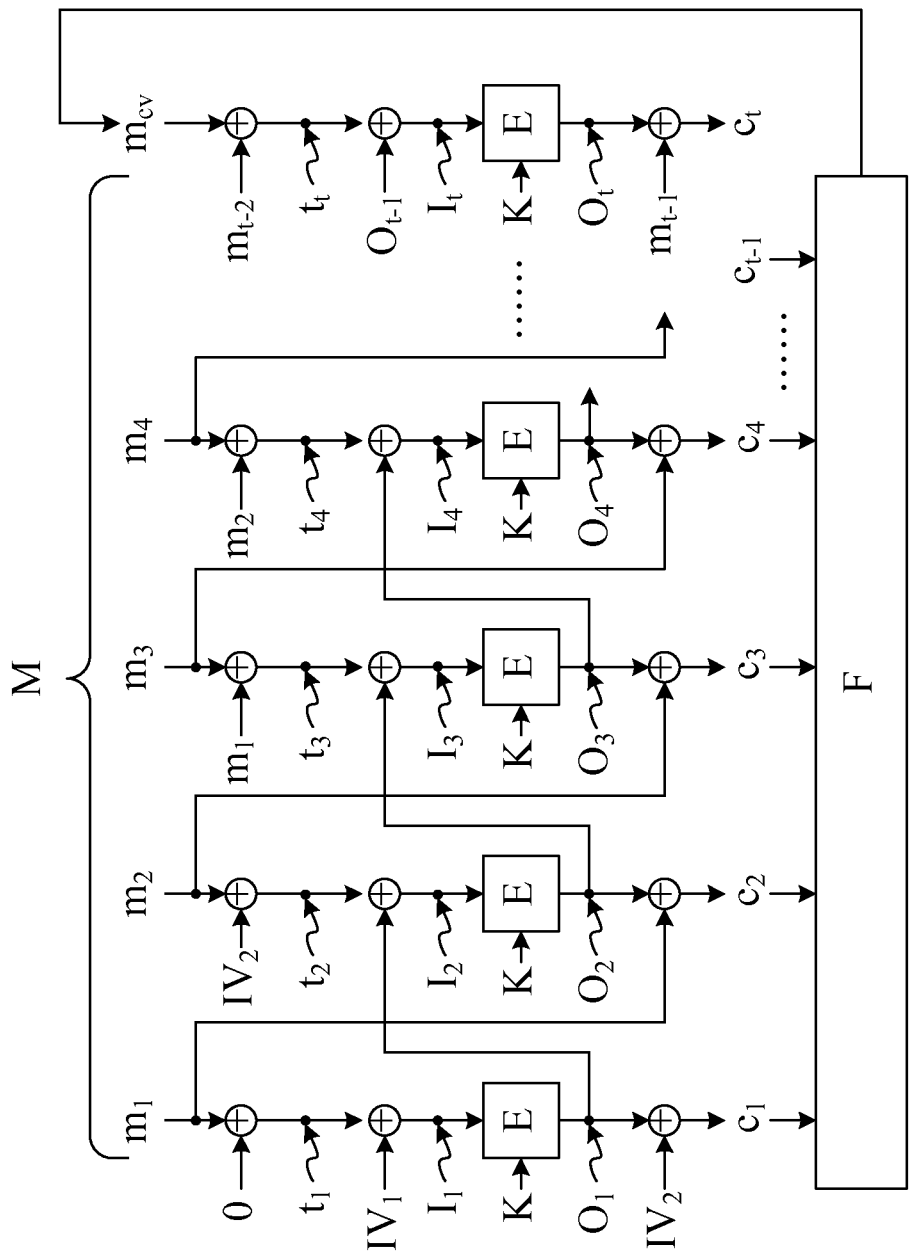
FIG. 3B is a schematic view depicting how the message block $m_{c_v}$ is generated.

Moreover, in other implementations, the storage unit 21 of the block encryption apparatus 2 may not be stored with the message block $m_{cv}$. In these implementations, the processing unit 23 performs an operation F on the encrypted blocks $c_1, c_2, c_3, c_4, \ldots, c_{t-1}$ after the encrypted blocks $c_1, c_2, c_3, c_4, \ldots, c_{t-1}$ are obtained and before the last one of the message blocks (i.e., the message block $m_{cv}$) is processed and takes the result of the operation as the message block $m_{cv}$, as shown in FIG. 3B. For example, the processing unit 23 may perform an XOR operation on the encrypted blocks $c_1, c_2, c_3, c_4, \ldots, c_{t-1}$ to obtain a temporary block and then perform a function operation on the temporary block to obtain the message block $m_{cv}$. The aforesaid function operation may be a key encrypting operation, a rotation operation, a hash operation or any other function operation on which an agreement has been reached in advance with the decryption side.

This embodiment is different from the first embodiment only in how the input blocks $I_1, I_2, I_3, I_4, \ldots, I_t$ are generated. Therefore, this embodiment still associates the message blocks $m_1, m_2, m_3, \ldots, m_{t-1}$ with the encrypted blocks $c_2, c_3, c_4, \ldots, c_t$ respectively, and associates the encrypted blocks $c_1, c_2, c_3, \ldots, c_{t-1}$ with the message blocks $m_2, m_3, m_4, \ldots, m_{cv}$ respectively. Thus, the encryption technology disclosed in this embodiment can generate the electronic encrypted file C in an efficient way, while still satisfying the three basic security requirements of confidentiality, integrity and source authentication simultaneously.

Figure 3C:
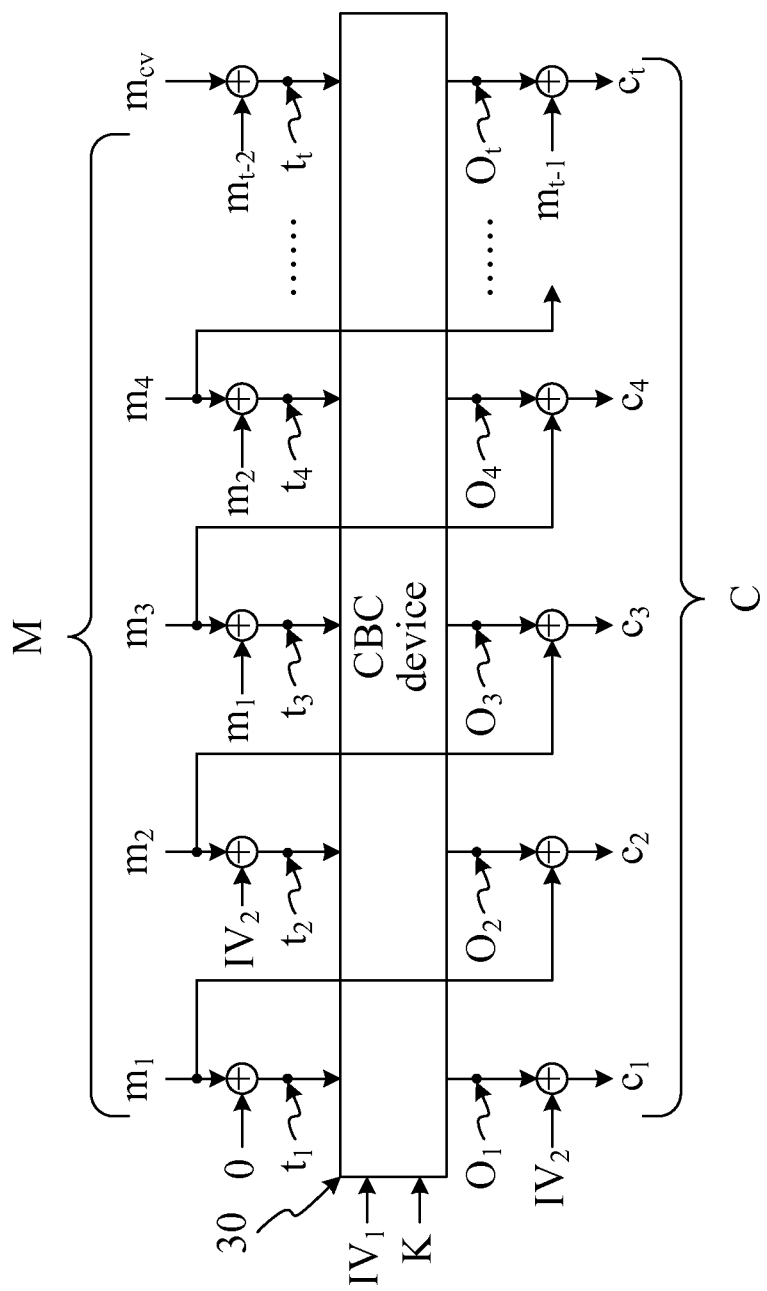
FIG. 3C is a schematic view depicting encryption operations according to a third embodiment of the present invention.

A third embodiment of the present invention is the block encryption apparatus 2 as shown in FIG. 2A and FIG. 3C. FIG. 3C is a schematic view depicting encryption operations. While the operation principle of the third embodiment is similar to that of the second embodiment, some operations in the second embodiment are executed by a conventional cipher block chaining (CBC) device 30 in this embodiment. Only differences between the third embodiment and the second embodiment will be detailed hereinafter.

In this embodiment, the processing unit 23 performs an XOR operation on each of the message blocks $m_1, m_2, m_3, \ldots, m_{t-1}, m_{cv}$ and a message block before a previous message block thereof respectively to obtain a plurality of temporary blocks $t_1, t_2, t_3, t_4, \ldots, t_t$. It should be appreciated that, when the first one of the message blocks (i.e., the message block $m_1$) is processed by the processing unit 23, the message block before the previous message block of the message block $m_1$ is an all-zero vector (i.e., $m[-1]=0$). When the second one of the message blocks (i.e., the message block $m_2$) is processed by the processing unit 23, the message block before the previous message block of the message block $m_2$ is the second vector $IV_2$.

Then, the processing unit 23 encrypts the temporary blocks $t_1, t_2, t_3, t_4, \ldots, t_t$ into a plurality of output blocks $O_1, O_2, O_3, O_4, \ldots, O_t$ by using the key K, the first vector $IV_1$ and the CBC device 30. The CBC device 30 operates as shown in FIG. 1A. Finally, the processing unit 23 performs an XOR operation on each of the output blocks $O_1, O_2, O_3, O_4, \ldots, O_t$ and a previous message block thereof respectively to obtain the encrypted blocks $c_1, c_2, c_3, \ldots, c_{t-1}, c_t$. It should be appreciated that, when the output block $O_1$ is processed, the processing unit 23 takes the second vector $IV_2$ as the previous message block of the output block $O_1$. In other words, the processing unit 23 performs an XOR operation on the output block $O_1$ and the second vector $IV_2$ to obtain the encrypted block $c_1$, and performs an XOR operation on each of the output blocks $O_2, O_3, O_4, \ldots, O_t$ and the message blocks $m_1, m_2, m_3, \ldots, m_{t-1}$ respectively to obtain the encrypted blocks $c_2, c_3, \ldots, c_{t-1}, c_t$.

As can be known from the above descriptions, the conventional CBC device 30 can be used to perform the encryption after a simple XOR operation is performed on the message blocks $m_1, m_2, m_3, \ldots, m_{t-1}, m_{cv}$ in this embodiment, and the encrypted blocks $c_1, c_2, c_3, \ldots, c_{t-1}, c_t$ can be generated after a simple XOR operation is performed on the output blocks $O_1, O_2, O_3, O_4, \ldots, O_t$ generated by the CBC device 30. In other words, the technology of the present invention can be implemented fast when the block encryption apparatus 2 is used together with the CBC device 30.

Figure 4A:
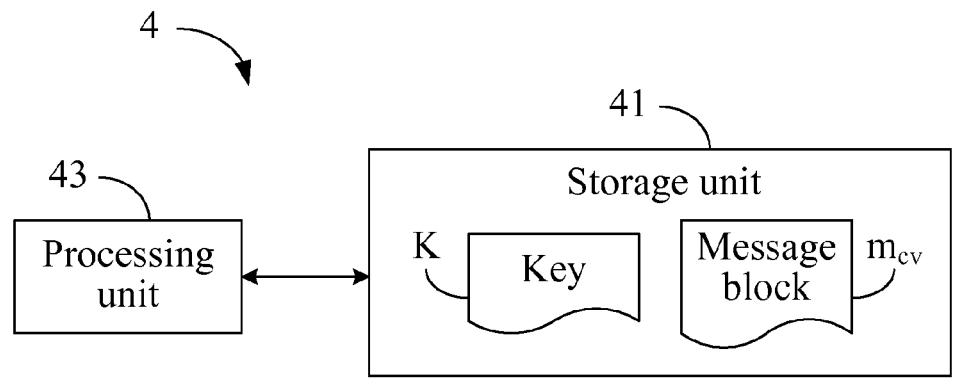
FIG. 4A is a schematic view depicting an architecture according to a fourth to a sixth embodiment of the present invention.
Figure 4B:
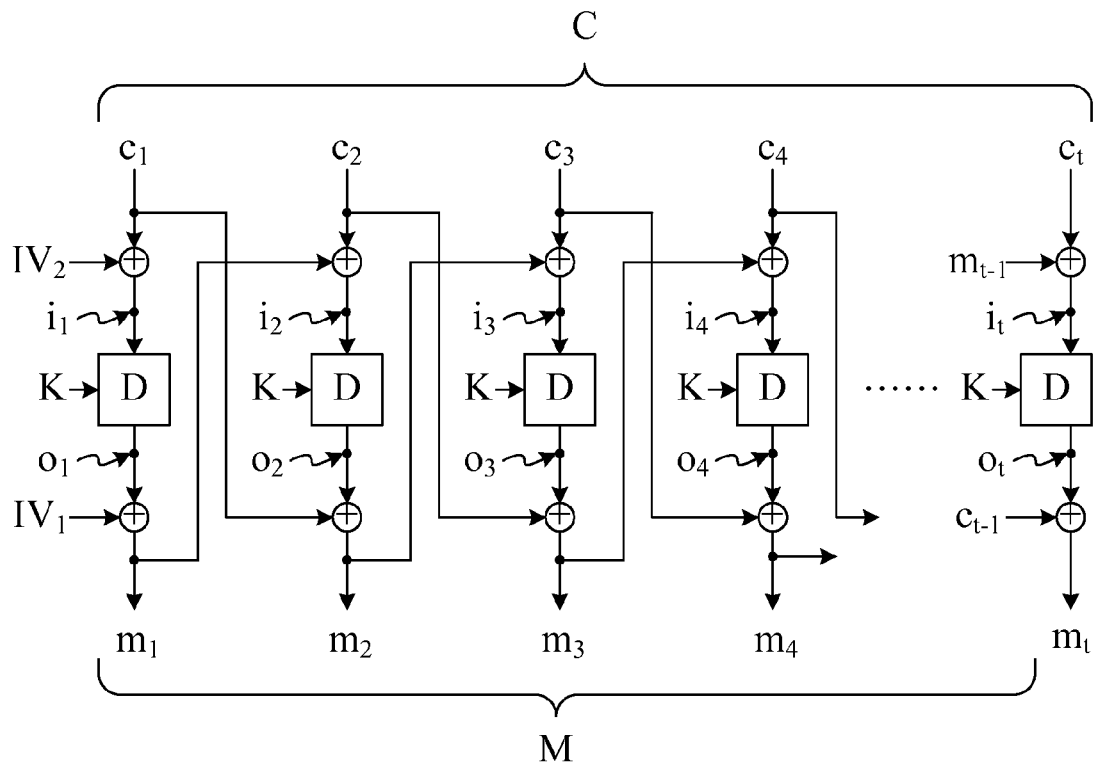
FIG. 4B is a schematic view depicting decryption operations according to the fourth embodiment of the present invention.

A fourth embodiment of the present invention is a block decryption apparatus 4, a schematic view depicting an architecture of which is shown in FIG. 4A, and a schematic view depicting decryption operations of which is shown in FIG. 4B. The block decryption apparatus 4 may be used together with the block encryption apparatus 2 of the first to the third embodiments. In other words, the block decryption apparatus 4 can decrypt the electronic encrypted file C encrypted by the block encryption apparatus 2.

The block decryption apparatus 4 comprises a storage unit 41 and a processing unit 43 which electrically connect with each other. The storage unit 41 is stored with the key K and the message block $m_{cv}$, the contents of which are the same as those in the block encryption apparatus 2. The message block $m_{cv}$ is used as the checking vector. The storage unit 41 may be a memory, a floppy disk, a hard disk, a compact disk (CD), a mobile disk, a magnetic tape, a database, or any other storage media or circuit with the same function and well known to those of ordinary skill in the art. The processing unit 43 may be any of various processors, central processing units (CPUs), microprocessors or other computing apparatuses well known to those of ordinary skill in the art.

The processing unit 43 obtains a first vector $IV_1$ and a second vector $IV_2$. It should be appreciated that, the first vector $IV_1$ and the second vector $IV_2$ obtained by the processing unit 43 are the same as the first vector $IV_1$ and the second vector $IV_2$ used by the encryption apparatus 2 for encrypting the electronic encrypted file C. The processing unit 43 firstly divides the electronic encrypted file C to be decrypted into a plurality of encrypted blocks $c_1, c_2, c_3, c_4, \ldots, c_t$. The encrypted blocks $c_1, c_2, c_3, c_4, \ldots, c_t$ have a sequence (i.e., in an order of encrypted blocks $c_1, c_2, c_3, c_4, \ldots, c_t$). It should be appreciated that, the electronic encrypted file C may be stored in the storage unit 41. Alternatively, if the block decryption apparatus 4 is further provided with an input interface, the electronic encrypted file C may also be received via this input interface from a transmitting party.

Then, the processing unit 43 performs the following operations on each of the encrypted blocks $c_1, c_2, c_3, c_4, \ldots, c_t$ according to the sequence: generating an input block, decrypting the input block by using the key K to obtain an output block, and generating a message block. It should be appreciated that, when each of the encrypted blocks $c_1, c_2, c_3, c_4, \ldots, c_t$ is processed by the processing unit 43, a value of each input block is equal to a value obtained by performing an XOR operation on the encrypted block being processed, an output block corresponding to a previous encrypted block of the encrypted block and an encrypted block before the previous encrypted block of the encrypted block, and a value of the message block is equal to a value obtained by performing an XOR operation on the output block corresponding to the encrypted block being processed and the previous encrypted block of the encrypted block. Specifically, each of the aforesaid input blocks can be expressed according to the following Equation (3):

$$i[i] = c[i] \ominus o[i-1] \ominus c[i-2] \qquad (3)$$

In the above Equation (3), the variable i represents a serial number of the encrypted block being processed, $i[i]$ represents the $i^{-th}$ input block, $o[i-1]$ represents the $i-1^{-th}$ output block, $c[i]$ represents the $i^{-th}$ encrypted block, $c[o-2]$ represents the $i-2^{-th}$ encrypted block, and the symbol $\ominus$ represents an XOR operation. It should be appreciated that, when the first one of the encrypted blocks (i.e., the encrypted block $c_1$) is processed by the processing unit 43, the output block corresponding to the previous encrypted block of the encrypted block $c_1$ is the second vector $IV_2$ (i.e., the value of $O[0]$ is equal to that of the second vector $IV_2$), and the encrypted block before the previous encrypted block of the encrypted block $c_1$ is an all-zero vector (i.e., $c[-1]=0$). When the second one of the encrypted blocks (i.e., the encrypted block $c_2$) is processed by the processing unit 43, the encrypted block before the previous encrypted block of the encrypted block $c_2$ is the first vector $IV_1$ (i.e., the value of $c[0]$ is equal to the first vector $IV_1$).

In this embodiment, processing unit 43 generates the input block by performing an XOR operation on the encrypted block and the message block corresponding to the previous encrypted block of the encrypted block. This is expressed by the following Equation (4), where $m[i-1]$ represents the $i-1^{-th}$ message block:

$$i[i] = c[i] \oplus m[i-1] \qquad (4)$$
$$= c[i] \oplus (o[i-1] \oplus c[i-2])$$

Moreover, in this embodiment, the processing unit 43 generates the message block by performing an XOR operation on the output block and the previous encrypted block of the encrypted block, as expressed by the following Equation (5):

$$m[i] = o[i] \ominus c[i-1] \qquad (5)$$

How each of the input blocks, the output blocks and the message blocks is generated will be further detailed now. Firstly, how the processing unit 43 processes the first one of the encrypted blocks (i.e., the encrypted block $c_1$) will be described. The processing unit 43 firstly performs an XOR operation on the encrypted block $c_1$ and the message block corresponding to the previous encrypted block of the encrypted block $c_1$ to obtain an input block $i_1$. The processing unit 43 takes the value of the second vector $IV_2$ as the value of the message block corresponding to the previous encrypted block of the encrypted block $c_1$. In other words, the processing unit 43 performs an XOR operation on the encrypted block $c_1$ and the second vector $IV_2$ to obtain the input block $i_1$. Then, the processing unit 43 performs a decryption operation D on the input block $i_1$ by using the key K and a symmetric decryption algorithm corresponding to the symmetric encryption algorithm used by the block encryption apparatus 2 to obtain an output block $o_1$. Afterwards, the processing unit 43 performs an XOR operation on the output block $o_1$ and the previous encrypted block of the encrypted block $c_1$ to obtain a message block $m_1$. The processing unit 43 takes the value of first vector $IV_1$ as the value of the previous encrypted block of the encrypted block $c_1$. In other words, the processing unit 43 performs an XOR operation on the output block $o_1$ and the first vector $IV_1$ to obtain the message block $m_1$.

Afterwards, for the rest of the encrypted blocks (i.e., the encrypted blocks $c_2, c_3, c_4, \ldots, c_t$), the processing unit 43 also firstly performs an XOR operation on each of the encrypted blocks $c_2, c_3, c_4, \ldots, c_t$ and the message block corresponding to the previous encrypted block thereof (i.e., message blocks $m_1, m_2, m_3, m_4, \ldots, m_{t-1}$) respectively to obtain input blocks $i_2, i_3, i_4, \ldots, i_t$; performs an decryption operation D on each of the input blocks $i_2, i_3, i_4, \ldots, i_t$ by using the key K and the symmetric decryption algorithm respectively to obtain output blocks $o_2, o_3, o_4, \ldots, o_t$; and then performs an XOR operation on each of the output blocks $o_2, o_3, o_4, \ldots, o_t$ and a previous encrypted block thereof (i.e., $c_1, c_2, c_3, c_4, \ldots, c_{t-1}$) respectively to obtain message blocks $m_2, m_3, m_4, \ldots, m_t$.

Afterwards, the processing unit 43 compares the last one of the message blocks $m_1, m_2, m_3, m_4, \ldots, m_t$ (i.e., the message block $m_t$) with the message block $m_{cv}$ (i.e., the checking vector). If the message block $m_t$ is the same as the message block $m_{cv}$, it indicates that the electronic encrypted file C has passed the verification. The processing unit 43 excludes the last one of the message blocks $m_1, m_2, m_3, m_4, \ldots, m_t$ (i.e., the message block $m_t$) and concatenates the message blocks $m_1, m_2, m_3, m_4, \ldots, m_{t-1}$ according to the sequence to generate a decrypted file (i.e., the electronic file M). If the message block $m_t$ is different from the message block $m_{cv}$, it indicates that the electronic encrypted file C fails the verification, and the processing unit 43 will discard the electronic encrypted file C.

Figure 4C:
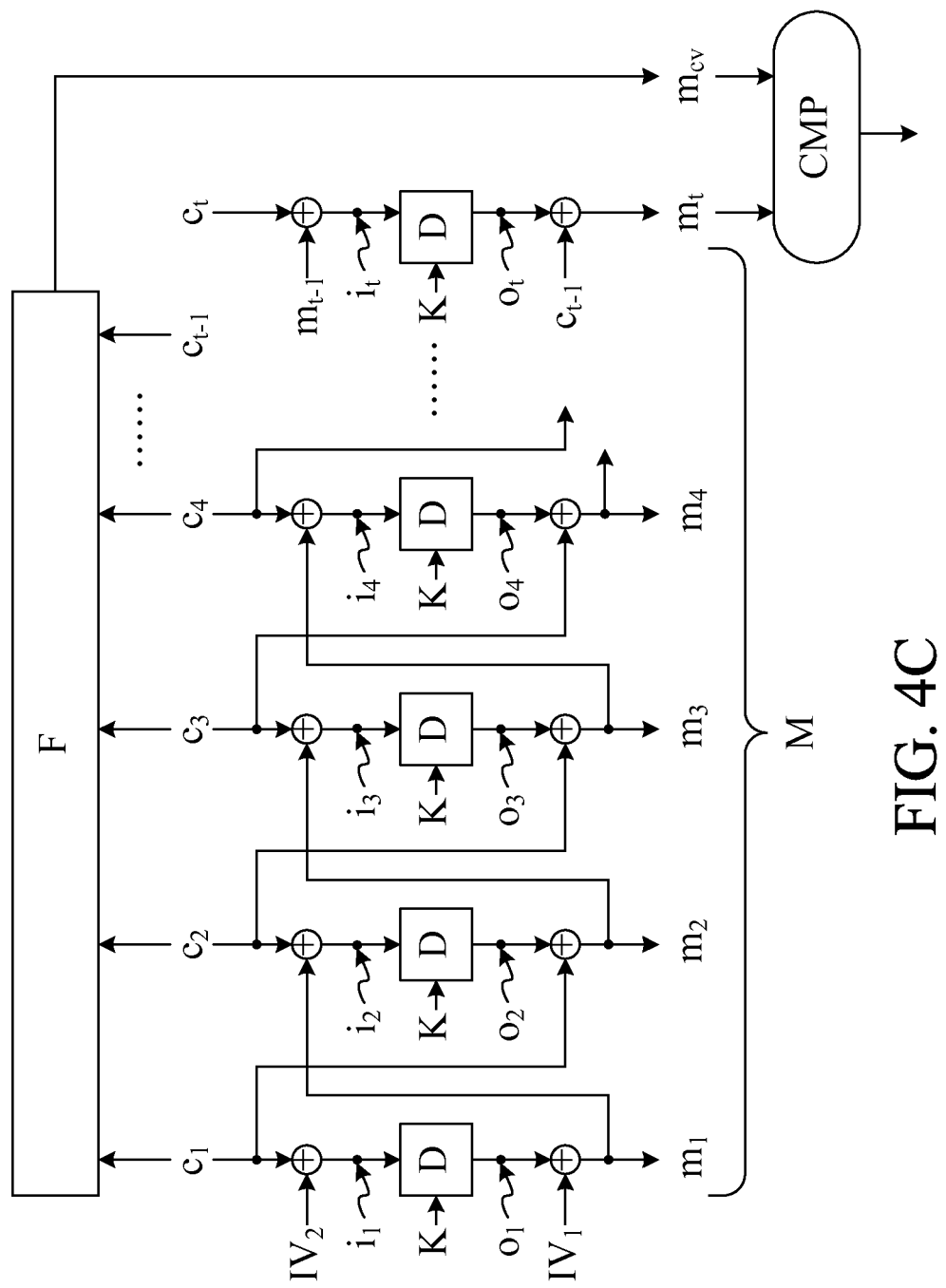
FIG. 4C is a schematic view depicting how the message block $m_{c_v}$ is generated.

It should be appreciated that, in other implementations, if the block encryption apparatus 2 performs the operation F on the encrypted blocks $c_1, c_2, c_3, c_4, \ldots, c_{t-1}$ during the encryption process and takes the result of the operation as the message block $m_{cv}$, then the processing unit 43 of the block decryption apparatus 4 must generate the message block, $m_{cv}$ by performing the same operation F on the encrypted blocks $c_1, c_2, c_3, c_4, \ldots, c_{t-1}$ correspondingly, as shown in FIG. 4C. For example, if the block encryption apparatus 2 performs an XOR operation on the encrypted blocks $c_1, c_2, c_3, c_4, \ldots, c_{t-1}$ to obtain a temporary block and performs a function operation on the temporary block to obtain the message block $m_{cv}$ previously, then the processing unit 43 of the block decryption apparatus 4 must also perform the same operation on the encrypted blocks $c_1, c_2, c_3, c_4, \ldots, c_{t-1}$ to obtain the message block $m_{cv}$ after dividing the electronic encrypted file C into the encrypted blocks $c_1, c_2, c_3, c_4, \ldots, c_t$. The aforesaid function operation may be a key encrypting operation, a rotation operation, a hash operation or any other function operation. It should be appreciated that, the encrypting party and the decrypting party need to reach an agreement on the same function operation in advance.

As can be known from the above descriptions and FIGS. 4B and 4C, if any one of the encrypted blocks $c_1, c_2, c_3, c_4, \ldots, c_t$ of electronic encrypted file C is tampered (or falsely tampered), the last one of the message blocks obtained by decrypting the electronic encrypted file C will be false. For example, if the encrypted block $c_2$ of the electronic encrypted file C is tampered (or falsely transmitted) into an encrypted block $c_2'$, all the message blocks $m_2, m_3, m_4, \ldots, m_t$ obtained by decryption would be false. Therefore, the block decryption apparatus 4 can determine whether the electronic encrypted file C is tampered (or falsely transmitted) by comparing the message block $m_t$ and the message block $m_{cv}$.

Figure 5A:
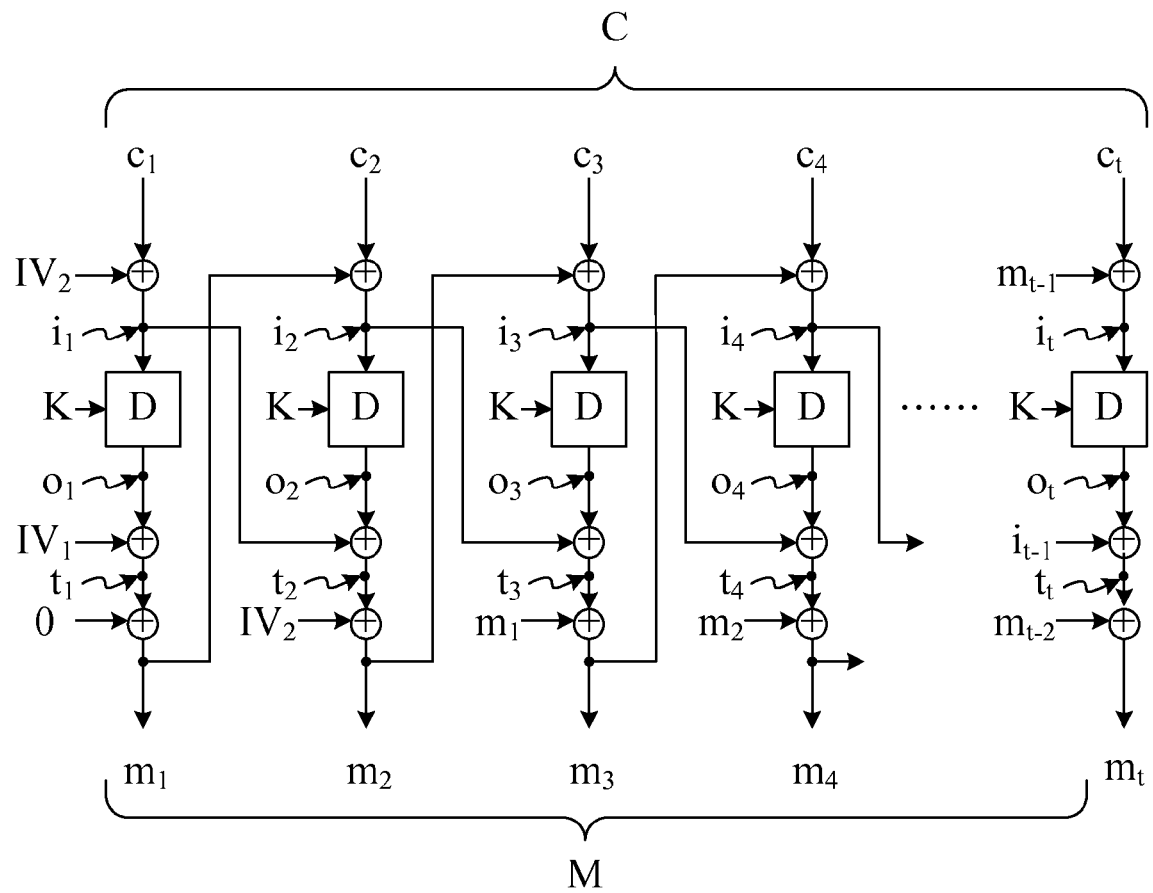
FIG. 5A is a schematic view depicting decryption operations according to the fifth embodiment of the present invention.

A fifth embodiment of the present invention is shown in FIGS. 4A and 5A. FIG. 5A is a schematic view depicting decryption operations. In this embodiment, the block decryption apparatus 4 may also be used together with the block encryption apparatus 2 of the first to the third embodiments. In other words, the block decryption apparatus 4 of this embodiment can decrypt the electronic encrypted file C encrypted by the block encryption apparatus 2. Most operations of the fifth embodiment are similar to those of the fourth embodiment, and only differences between the fifth embodiment and the fourth embodiment will be detailed hereinafter.

Similarly, the processing unit 43 obtains a first vector $IV_1$ and a second vector $IV_2$. It should be appreciated that, the first vector $IV_1$ and the second vector $IV_2$ obtained by the processing unit 43 are the same as the first vector $IV_1$ and the second vector $IV_2$ used by the encryption apparatus 2 for encrypting the electronic encrypted file C. Furthermore, the processing unit 43 divides the electronic encrypted file C to be decrypted into a plurality of encrypted blocks $c_1, c_2, c_3, c_4, \ldots, c_t$. The encrypted blocks $c_1, c_2, c_3, c_4, \ldots, c_t$ have a sequence (i.e., in an order of encrypted blocks $c_1, c_2, c_3, c_4, \ldots, c_t$). Then, the processing unit 43 performs the following operations on each of the encrypted blocks $c_1, c_2, c_3, c_4, \ldots, c_t$ according to the sequence: generating an input block, encrypting the input block by using a key to obtain an output block, and generating a message block. A value of the input block is equal to a value obtained by performing an XOR operation on the encrypted block, an output block corresponding to a previous encrypted block of the encrypted block, and an encrypted block before the previous encrypted block of the encrypted block. A value of the message block is equal to a value obtained by performing an XOR operation on the output block and the previous encrypted block of the encrypted block.

In this embodiment, when each of the encrypted blocks $c_1, c_2, c_3, c_4, \ldots, c_t$ is processed, the processing unit 43 generates the input block by performing an XOR operation on the encrypted block and the message block corresponding to the previous encrypted block of the encrypted block. In other words, the processing unit 43 generates input blocks $i_1, i_2, i_3, i_4, \ldots, i_t$ according to the aforesaid Equation (4). This is the same as the fourth embodiment, and thus will not be further described herein.

The output blocks are generated in a different way in this embodiment. Specifically, for each of the encrypted blocks $c_1, c_2, c_3, c_4, \ldots, c_t$, the processing unit 43 generates the message block by performing an XOR operation on the message block corresponding to the encrypted block before the previous encrypted block of the encrypted block, the output block and the input block corresponding to the previous encrypted block of the encrypted block, as expressed by the following Equation (6):

$$\begin{aligned} m[i] &= m[i-2] \oplus t[i] \\ &= m[i-2] \oplus (o[i] \oplus i[i-1]) \\ &= m[i-2] \oplus o[i] \oplus (m[i-2] \oplus c[i-1]) \\ &= m[i-2] \oplus c[i-1] \end{aligned} \qquad (6)$$

It should be appreciated that, when the first one of the encrypted blocks (i.e., the encrypted block $c_1$) is processed by the processing unit 43, the message block corresponding to the encrypted block before the previous encrypted block of the encrypted block is an all-zero vector and the input block corresponding to the previous encrypted block of the encrypted block is the first vector. Moreover, when the second one of the encrypted blocks (i.e., the encrypted block $c_2$) is processed by the processing unit 43, the message block corresponding to the encrypted block before the previous encrypted block of the encrypted block is the second vector.

How each of the input blocks, the output blocks and the message blocks is generated will be further detailed now. Firstly, how the processing unit 43 processes the first one of the encrypted blocks (i.e., the encrypted block $c_1$) will be described. The processing unit 43 firstly performs an XOR operation on the encrypted block $c_1$ and the message block corresponding to the previous encrypted block of the encrypted block $c_1$ to generate an input block $i_1$. The processing unit 43 takes the second vector $IV_2$ as the message block corresponding to the previous encrypted block of the encrypted block $c_1$. In other words, the processing unit 43 performs an XOR operation on the encrypted block $c_1$ and the second vector $IV_2$ to generate the input block $i_1$. Then, the processing unit 43 performs a decryption operation D on the input block $i_1$ by using the key K and a symmetric decryption algorithm corresponding to the symmetric encryption algorithm used by the block encryption apparatus 2 to obtain an output block $o_1$. Afterwards, the processing unit 43 performs an XOR operation on the output block $o_1$ and the input block corresponding to a previous encrypted block of the encrypted block $c_1$ to obtain a temporary block $t_1$, and then performs an XOR operation on the temporary block $t_1$ and the message block corresponding to the encrypted block before the previous encrypted block of the encrypted block $c_1$ to obtain the message block $m_1$. The processing unit 43 takes the first vector $IV_1$ as the input block corresponding to the previous encrypted block of the encrypted block $c_1$ (i.e., the value of $i[0]$ is equal to the value of the first vector $IV_1$), and takes the full-zero vector as the message block corresponding to the encrypted block before the previous encrypted block of the encrypted block $c_1$ (i.e., the value of $m[-1]$ is equal to the value of the full-zero vector). In other words, the processing unit 43 performs an XOR operation on the output block $o_1$ and the first vector $IV_1$ to obtain the temporary block $t_1$, and then performs an XOR operation on the temporary block $t_1$ and the full-zero vector to obtain the message block $m_1$.

How the processing unit 43 processes the second one of the encrypted blocks (i.e., the encrypted block $c_2$) will be described next. The processing unit 43 firstly performs an XOR operation on the encrypted block $c_2$ and the message block corresponding to the previous encrypted block of the encrypted block $c_2$ (i.e., the message block $m_1$) to obtain an input block $i_2$. Then, the processing unit 43 performs a decryption operation D on the input block $i_2$ by using the key K and the same symmetric decryption algorithm to obtain an output block $o_2$. Afterwards, the processing unit 43 performs an XOR operation on the output block $o_2$ and the input block corresponding to the previous encrypted block of the encrypted block $c_2$ (i.e., the input block $i_1$) to obtain a temporary block $t_2$, and then performs an XOR operation on the temporary block $t_2$ and the message block corresponding to the encrypted block before the previous encrypted block of the encrypted block $c_2$ to obtain the message block $m_2$. The processing unit 43 takes the second vector $IV_2$ as the message block corresponding to the encrypted block before the previous encrypted block of the encrypted block $c_2$ (i.e., the value of m[0] is equal to the value of the second vector $IV_2$). In other words, the processing unit 43 performs an XOR operation on the output block $o_2$ and the input block $i_1$ to obtain the temporary block $t_2$, and then performs an XOR operation on the temporary block $t_2$ and the second vector $IV_2$ to obtain the message block $m_2$.

Afterwards, for the rest of the encrypted blocks (i.e., the encrypted blocks $c_3, c_4, \ldots, c_t$), the processing unit 43 also firstly performs an XOR operation on each of the encrypted blocks $c_3, c_4, \ldots, c_t$ and the message block corresponding to a previous encrypted block thereof (i.e., the message blocks $m_2, m_3, \ldots, m_{t-1}$) respectively to obtain input blocks $i_3, i_4, \ldots, i_t$; performs a decryption operation D on each of the input blocks $i_3, i_4, \ldots, i_t$ by using the key K and the symmetric decryption algorithm to obtain output blocks $o_3, o_4, \ldots, o_t$; performs an XOR operation on each of the output blocks $o_3, o_4, \ldots, o_t$ and the input block corresponding to the previous encrypted block thereof (i.e., the input blocks $i_2, i_2, \ldots, i_{t-1}$) respectively to obtain temporary blocks $t_3, t_4, \ldots, t_t$; and then performs an XOR operation on each of the temporary blocks $t_3, t_4, \ldots, t_t$ and the message block corresponding to the encrypted block before the previous encrypted block thereof (i.e., the message blocks $m_1, m_2, \ldots, m_{t-2}$) respectively to obtain the message blocks $m_3, m_4, \ldots, m_t$.

Afterwards, the processing unit 43 compares the last one of the message blocks $m_1, m_2, m_3, m_4, \ldots, m_t$ (i.e., the message block $m_t$) with the message block $m_{cv}$ (i.e., the checking vector). If the message block $m_t$ is the same as the message block $m_{cv}$, it indicates that the electronic encrypted file C has passed the verification. The processing unit 43 excludes the last one of the message blocks $m_1, m_2, m_3, m_4, \ldots, m_t$ (i.e., the message block $m_t$) and then concatenates the message blocks $m_1, m_2, m_3, m_4, \ldots, m_{t-1}$ according to the sequence to generate a decrypted file (i.e., the electronic file M). If the message block $m_t$ is different from the message block $m_{cv}$, it indicates that the electronic encrypted file C fails the verification and the processing unit 43 will discard the electronic encrypted file C.

Figure 5B:
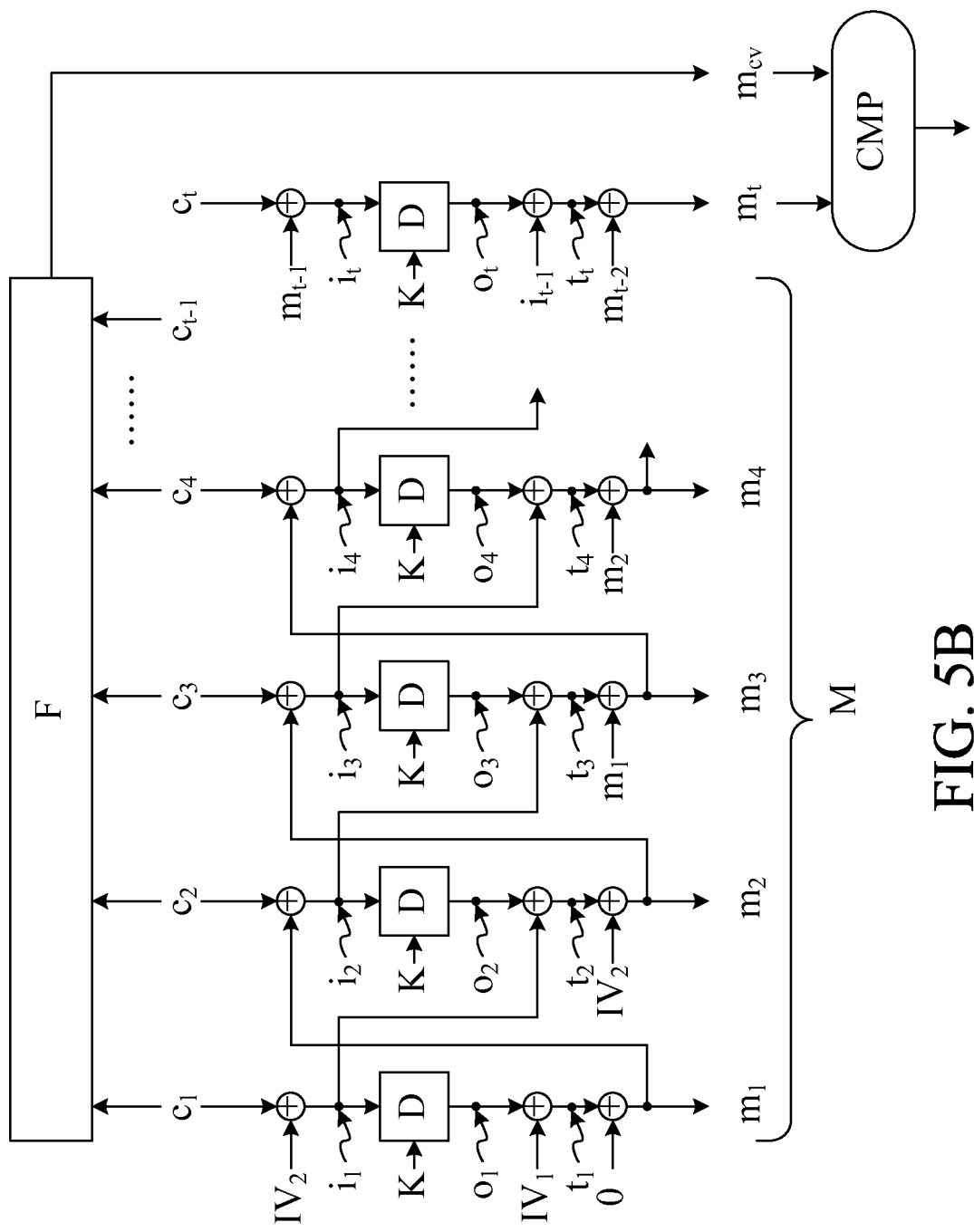
FIG. 5B is a schematic view depicting how the message block $m_{c_v}$ is generated.

It should be appreciated that, in other implementations, if the block encryption apparatus 2 performs the operation F on the encrypted blocks $c_1, c_2, c_3, c_4, \ldots, c_{t-1}$ during the encryption process and takes the result of the operation as the message block $m_{cv}$, then the processing unit 43 of the block decryption apparatus 4 must generate the message block $m_{cv}$ by using the same operation F correspondingly, as shown in FIG. 5B. For example, if the block encryption apparatus 2 performs an XOR operation on the encrypted blocks $c_1, c_2, c_3, c_4, \ldots, c_{t-1}$ to obtain a temporary block and performs a function operation on the temporary block to obtain the message block $m_{cv}$ previously, then the processing unit 43 of the block decryption apparatus 4 must perform the same operation on the encrypted blocks $c_1, c_2, c_3, c_4, \ldots, c_{t-1}$ to obtain the message block $m_{cv}$ after dividing the electronic encrypted file C into the encrypted blocks $c_1, c_2, c_3, c_4, \ldots, c_t$. The aforesaid function operation may be a key encrypting operation, a rotation operation, a hash operation or any other function operation. It should be appreciated that, the encrypting party and the decrypting party need to reach an agreement on the same function operation in advance.

As can be known from the above descriptions and FIGS. 5A and 5B, if any one of the encrypted blocks $c_1, c_2, c_3, c_4, \ldots, c_t$ of electronic encrypted file C is tampered (or falsely tampered), the last one of the message blocks obtained by decrypting the electronic encrypted file C will be false. Therefore, with the technology disclosed in this embodiment, the block decryption apparatus 4 can determine whether the electronic encrypted file C is tampered (or falsely transmitted) by comparing the message block $m_t$ and the message block $m_{cv}$.

Figure 6A:
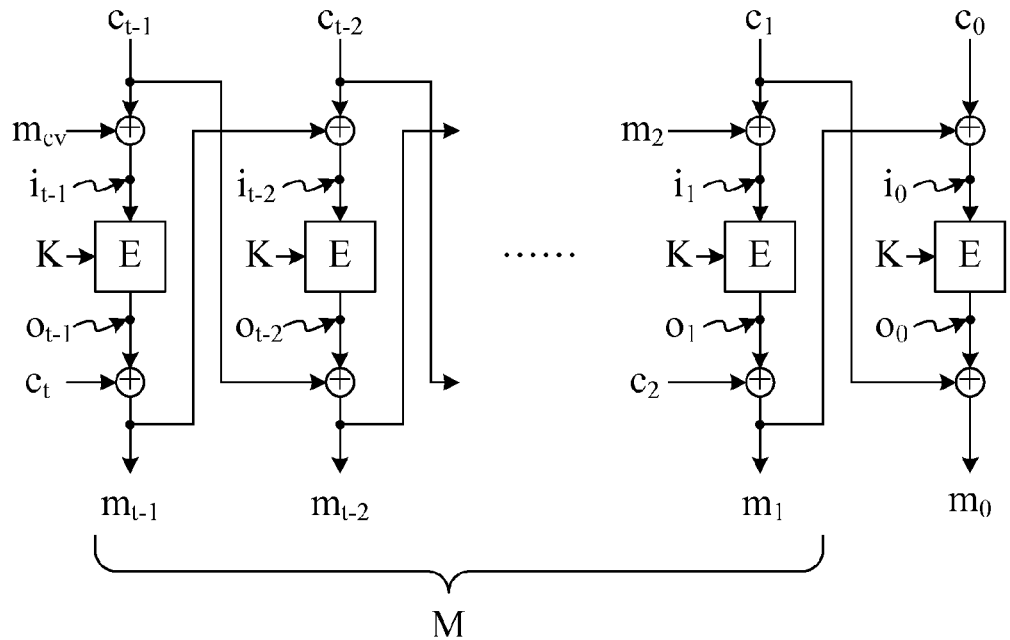
FIG. 6A is a schematic view depicting decryption operations according to the sixth embodiment of the present invention.

A sixth embodiment of the present invention is shown in FIGS. 4A and 6A. FIG. 6A is a schematic view depicting decryption operations according to this embodiment. In this embodiment, the block decryption apparatus 4 may be used together with the block encryption apparatus 2 of the first to the third embodiments. In other words, the block decryption apparatus 4 can decrypt the electronic encrypted file C encrypted by the block encryption apparatus 2. Some operations of the sixth embodiment are similar to those of the fourth and the fifth embodiments, and only differences therebetween will be detailed hereinafter.

Similarly, the processing unit 43 obtains a first vector $IV_1$ and a second vector $IV_2$. It should be appreciated that, the first vector $IV_1$ and the second vector $IV_2$ obtained by the processing unit 43 are the same as the first vector $IV_1$ and the second vector $IV_2$ used by the encryption apparatus 2 for encrypting the electronic encrypted file C. Furthermore, the processing unit 43 firstly divides the electronic encrypted file C to be decrypted into a plurality of encrypted blocks $c_1, c_2, c_3, c_4, \ldots, c_t$. The encrypted blocks $c_1, c_2, c_3, c_4, \ldots, c_t$ have a first sequence (i.e., in an order of encrypted blocks $c_1, c_2, c_3, c_4, \ldots, c_t$). Furthermore, the processing unit 43 takes the last one of the encrypted blocks (i.e., the encrypted block $c_t$) as a reference vector.

Then, the processing unit 43 excludes the last one of the encrypted blocks $c_1, c_2, c_3, c_4, \ldots, c_t$ (i.e., the encrypted block $c_t$). Afterwards, the processing unit 43 re-arranges the encrypted blocks $c_1, c_2, c_3, c_4, \ldots, c_{t-1}$ into encrypted blocks $c_{t-1}, c_{t-2}, \ldots, c_1$ according to a second sequence which is reverse to the first sequence. Afterwards, the processing unit 43 adds the first vector $IV_1$ into the encrypted blocks $c_{t-1}, c_{t-2}, \ldots, c_1$ as the last one of the encrypted blocks (i.e., the encrypted block $c_0$). In other words, the encrypted block $c_0$ is just the first vector $IV_1$.

Then, the processing unit 43 performs the following operations on each of the encrypted blocks $c_{t-1}, c_{t-2}, \ldots, c_1, c_0$ according to the second sequence: generating an input block, encrypting the input block by using a key to obtain an output block, and generating a message block by performing an XOR operation on the output block and the previous encrypted block of the encrypted block. A value of the input block is equal to a value obtained by performing an XOR operation on the encrypted block, an output block corresponding to a previous encrypted block of the encrypted block, and an encrypted block before the previous encrypted block of the encrypted block, as expressed by the following Equation (7):

$$i[i]=c[i]\ominus o[i-1]\ominus c[i-2] \quad (7)$$

It should be appreciated that, when the first one of the encrypted blocks (i.e., the encrypted block $c_{t-1}$) is processed by the processing unit 43, the output block corresponding to the previous encrypted block of the encrypted block $c_{t-1}$ is the message block $m_{cv}$ (i.e., the value of o[0] is equal to that of the message block $m_{cv}$ which is the checking vector), and the encrypted block before the previous encrypted block of the encrypted block $c_{t-1}$ is an all-zero vector (i.e., the value of c[−1] is equal to that of the all-zero vector). Moreover, when the second one of the encrypted blocks (i.e., the encrypted block $c_{t-2}$) is processed by the processing unit 43, the encrypted block before the previous encrypted block of the encrypted block $c_{t-2}$ is the encrypted block $c_t$ (i.e., the value of c[0] is equal to that of the encrypted block $c_t$ which is the reference vector).

In this embodiment, the processing unit 43 generates the input block by performing an XOR operation on the encrypted block and the message block corresponding to the previous encrypted block of the encrypted block, as expressed by the following Equation (8):

$$i[i] = c[i] \oplus m[i-1] \quad (8)$$
$$= c[i] \oplus o[i-1] \oplus c[i-2]$$

How each of the input blocks, the output blocks and the message blocks is generated will be further detailed now. Firstly, how the processing unit 43 processes the first one of the encrypted blocks (i.e., the encrypted block $c_{t-1}$) will be described. The processing unit 43 firstly performs an XOR operation on the encrypted block $c_{t-1}$ and the message block corresponding to the previous encrypted block of the encrypted block $c_{t-1}$ to obtain an input block $i_{t-1}$. The processing unit 43 takes the message block $m_{cv}$, which is the checking vector, as the message block corresponding to the previous encrypted block. In other words, the processing unit 43 performs an XOR operation on the encrypted block $c_{t-1}$ and the message block $m_{cv}$ to obtain the input block $i_{t-1}$. Then, the processing unit 43 performs an encryption operation E on the input block $i_{t-1}$ by using the key K and the symmetric encryption algorithm used by the block encryption apparatus 2 to obtain an output block $o_{t-1}$. Afterwards, the processing unit 43 performs an XOR operation on the output block $o_{t-1}$ and the previous encrypted block of the encrypted block $c_{t-1}$ to obtain the message block $m_{t-1}$. The processing unit 43 takes the encrypted block $c_t$, which is the reference vector, as the previous encrypted block of the encrypted block $c_{t-1}$. In other words, the processing unit 43 performs an XOR operation on the output block $o_{t-1}$ and the encrypted block $c_t$ to obtain the message block $m_{t-1}$.

Next, how the processing unit 43 processes the rest of the encrypted blocks (i.e., the encrypted blocks $c_{t-2}, \ldots, c_1, c_0$) will be described. Specifically, the processing unit 43 firstly performs an XOR operation on each of the encrypted blocks $c_{t-2}, \ldots, c_1, c_0$ and a message block corresponding to the previous encrypted block thereof (i.e., message blocks $m_{t-1}, \ldots, m_2, m_1$) respectively to obtain input blocks $i_{t-2}, \ldots, i_1, i_0$; performs an encryption operation E on each of the input blocks $i_{t-2}, \ldots, i_1, i_0$ by using the key K and the same symmetric encryption algorithm to obtain output blocks $o_{t-2}, \ldots, o_1, o_0$ respectively; and then performs an XOR operation on each of the output blocks $o_{t-2}, \ldots, o_1, o_0$ and the previous encrypted block thereof (i.e., the encrypted blocks $c_{t-1}, \ldots, c_2, c_1$) respectively to obtain the message blocks $m_{t-2}, \ldots, m_1, m_0$.

Afterwards, the processing unit 43 compares the last one of the message blocks $m_{t-1}, m_{t-2}, \ldots, m_1, m_0$ (i.e., the message block $m_0$) with the second vector $IV_2$. If the message block $m_0$ is the same as the second vector $IV_2$, it indicates that the electronic encrypted file C has passed the verification. The processing unit 43 excludes the last one of the message blocks $m_{t-1}, m_{t-2}, \ldots, m_1, m_0$ (i.e., the message block $m_0$) and concatenates the message blocks $m_{t-1}, m_{t-2}, \ldots, m_1$ reversely according to the second sequence to generate a decrypted file (i.e., the electronic file M). In other words, the processing unit 43 concatenates the message blocks $m_1, \ldots, m_{t-2}, m_{t-1}$ to generate the decrypted file. If the message block $m_0$ is different from the second vector $IV_2$, it indicates that the electronic encrypted file C fails the verification, and the processing unit 43 will discard the electronic encrypted file C.

Figure 6B:
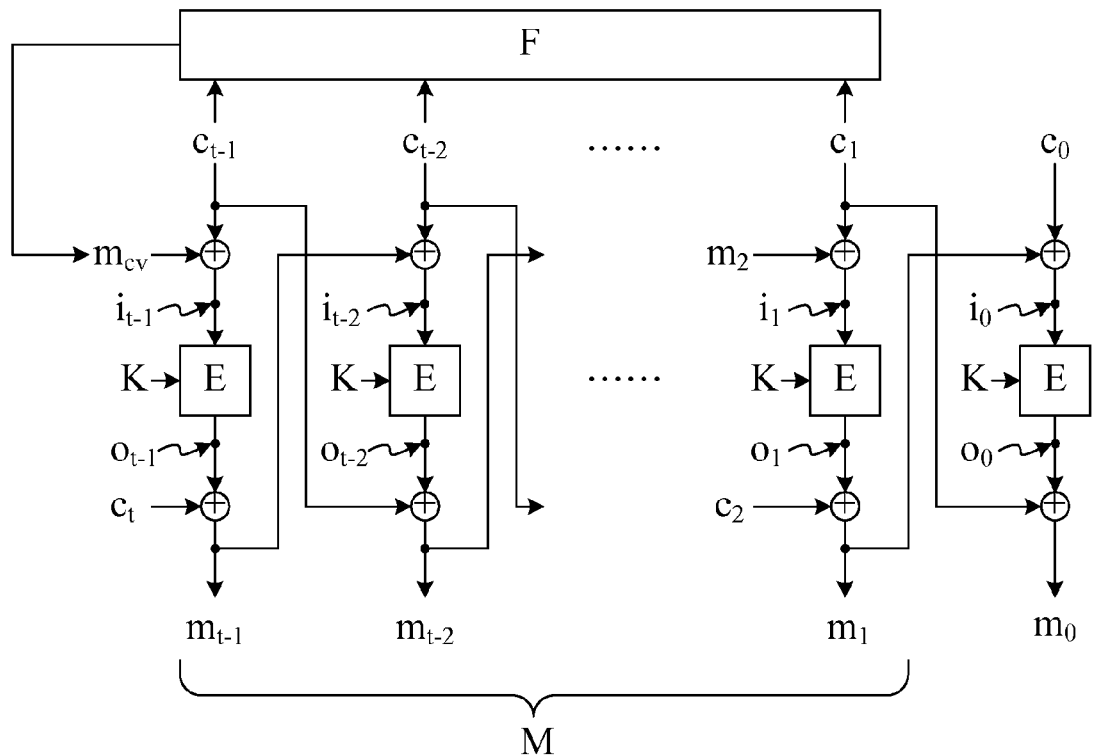
FIG. 6B is a schematic view depicting how the message block $m_{c_v}$ is generated.

It should be appreciated that, in other implementations, if the block encryption apparatus 2 performs the operation F on the encrypted blocks $c_1, c_2, c_3, c_4, \ldots, c_{t-1}$ during the encryption process and takes the result of the operation as the message block $m_{cv}$, then the processing unit 43 of the block decryption apparatus 4 must generate the message block $m_{cv}$ by using the same operation F correspondingly, as shown in FIG. 6B. For example, if the block encryption apparatus 2 performs an XOR operation on the encrypted blocks $c_1, c_2, c_3, c_4, \ldots, c_{t-1}$ to obtain a temporary block and performs a function operation on the temporary block to obtain the message block $m_{cv}$ previously, then the processing unit 43 of the block decryption apparatus 4 must perform the same operation on the encrypted blocks $c_1, c_2, c_3, c_4, \ldots, c_{t-1}$ to obtain the message block $m_{cv}$ after dividing the electronic encrypted file C into the encrypted blocks $c_1, c_2, c_3, c_4, \ldots, c_t$. The aforesaid function operation may be a key encrypting operation, a rotation operation, a hash operation or any other function operation. It should be appreciated that, the encrypting party and the decrypting party need to reach an agreement on the same function operation in advance.

As can be known from the above descriptions and FIGS. 6A and 6B, the block decryption apparatus 4 can accomplish the decryption function with the encryption mechanism disclosed in the first and the second embodiments by re-arranging the encrypted blocks $c_0, c_1, c_2, c_3, c_4, \ldots, c_{t-1}, c_t$. Furthermore, as in the aforesaid embodiments, if any one of the encrypted blocks $c_1, c_2, c_3, c_4, \ldots, c_t$ of the electronic encrypted file C is tampered (or falsely tampered), the last one of the message blocks obtained by decrypting the electronic encrypted file C will be false. Therefore, with the technology disclosed in this embodiment, the block decryption apparatus 4 can determine whether the electronic encrypted file C is tampered (or falsely transmitted) by comparing the message block $m_0$ with the vector $IV_2$.

Figure 6C:
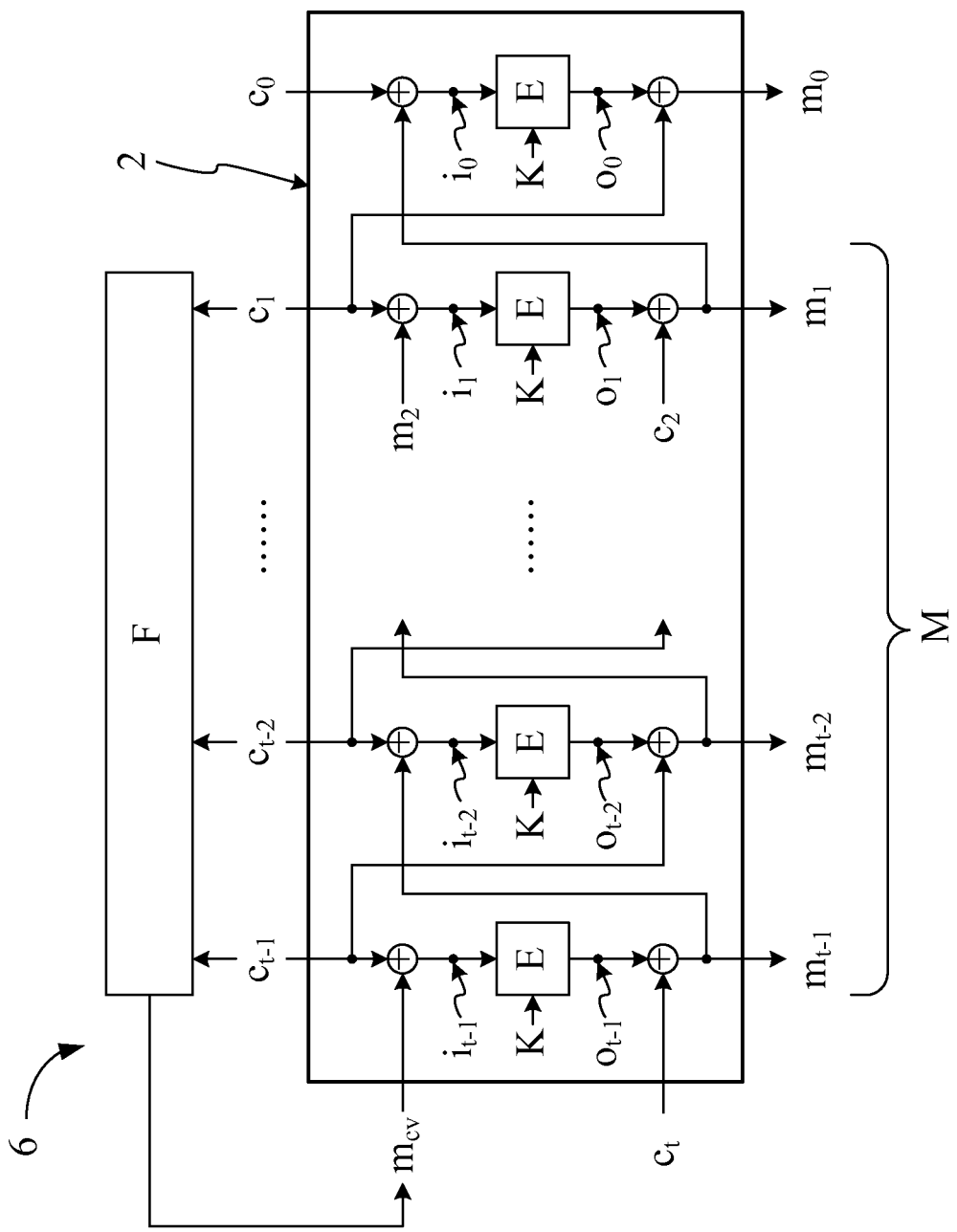
FIG. 6C is a schematic view depicting decryption operations according to a seventh embodiment of the present invention.

A seventh embodiment of the present invention is a block decryption apparatus 6, the operation principle of which is shown in FIG. 6C. The seventh embodiment has an operation principle the same as that of the sixth embodiment, but is different from the sixth embodiment only in that, the block decryption apparatus 6 of this embodiment accomplishes the decryption operations by using the block encryption apparatus 2. The operations of the block decryption apparatus 6 and the block encryption apparatus 2 comprised therein are the same as those shown in FIG. 6B. The internal operations of the block encryption apparatus 2 are the same as those shown in FIG. 2B.

As can be known by comparing FIG. 2B with FIG. 6C, if the electronic encrypted file C is to be decrypted by the block decryption apparatus 6, only data positions need to be adjusted in order to achieve the decryption effect by using the block encryption apparatus 2. Specifically, the encrypted blocks $c_0, c_1, c_2, c_3, c_4, \ldots, c_{t-1}$ need to be re-arranged into encrypted blocks $c_{t-1}, c_{t-2}, \ldots, c_1, c_0$ as an input of the block encryption apparatus 2. Furthermore, the first vector IV1 and the second vector IV2 which would be input to the block encryption apparatus 2 are replaced with the message block $m_{cv}$ and the encrypted block $c_t$. The block encryption apparatus 2 decrypts the encrypted blocks $c_{t-1}, c_{t-2}, \ldots, c_1, c_0$ by using the message block $m_{cv}$ and the encrypted block $c_t$ to generate the message blocks $m_{t-1}, m_{t-2}, \ldots, m_1, m_0$. The message blocks $m_{t-1}, m_{t-2}, \ldots, m_1$ are then re-arranged reversely to obtain the decrypted file.

As can be known from the above descriptions and FIG. 6C, the present invention can achieve the decryption effect with the block encryption apparatus by adjusting the data positions.

Figure 7:
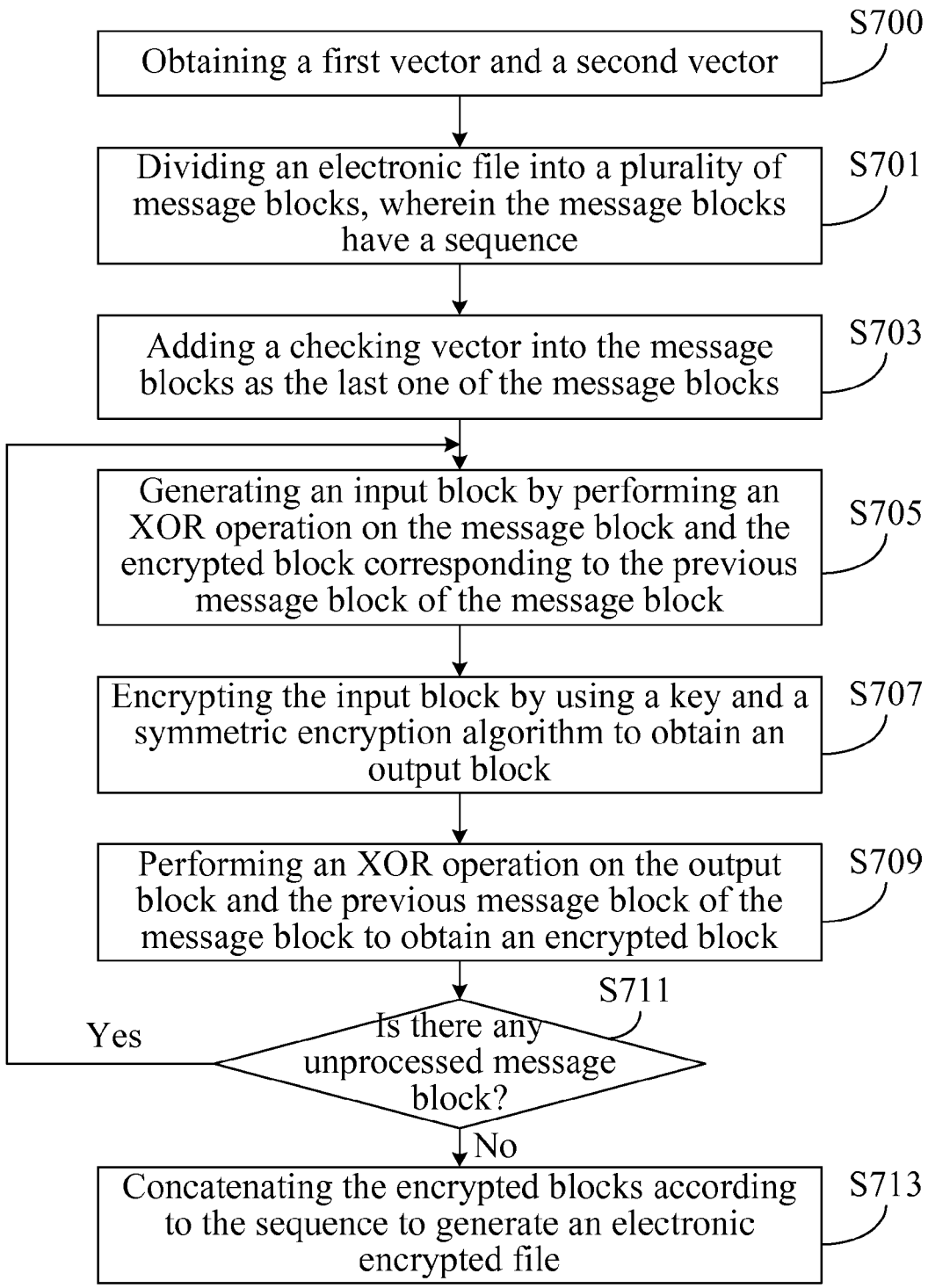
FIG. 7 is a flowchart diagram of an eighth embodiment of the present invention.

An eighth embodiment of the present invention is a computer-implemented block encryption method, a flowchart diagram of which is shown in FIG. 7. The computer for implementing the block encryption method may be the aforesaid block encryption apparatus 2 and is stored with a checking vector and a key. The operation principle of the eighth embodiment is the same as that of the first embodiment, so please refer to FIG. 2B together.

Firstly, in step S700, a first vector and a second vector are obtained. In step S701, an electronic file to be encrypted is divided into a plurality of message blocks, and the message blocks have a sequence. Then, in step S703, the checking vector is added into the message blocks as the last one of the message blocks. Then, steps S705, S707, S709 and S711 are executed on each of the message blocks according to the sequence until all the message blocks are processed.

Specifically, in the step S705, an input block is generated. A value of the input block is equal to a value obtained by performing an XOR operation on the message block, an output block corresponding to a previous message block of the message block and a message block before the previous message block of the message block. In this embodiment, the step S705 generates the input block by performing an XOR operation on the message block and the encrypted block corresponding to the previous message block of the message block. In the step S707, the input block is encrypted by using a key and a symmetric encryption algorithm to obtain an output block. In the step S709, an XOR operation is performed on the output block and the previous message block of the message block to obtain an encrypted block. Further speaking, when the first one of the message blocks is processed in the steps S705 and S709, the output block corresponding to the previous message block of the message block is the first vector and the message block before the previous message block of the message block is an all-zero vector. When the second one of the message blocks is processed in the steps S705 and S709, the message block before the previous message block of the message block is the second vector.

Afterwards, in step S711, it is determined whether there is any unprocessed message block. If the determination result of the step S711 is "yes", then the process goes back to the step S705 to continue to process the next message block. If the determination result of the step S711 is "no", it indicates that all the message blocks has been processed. Then, step S713 is executed to concatenate the encrypted blocks according to the sequence to generate an electronic encrypted file.

It should be appreciated that, in other implementations, the computer for implementing the block encryption method may not be stored with the checking vector. In these implementations, when there is only one unprocessed message block left in the steps S705, S707 and S709, the block encryption method may execute another step (not shown) firstly to perform an XOR operation on the encrypted blocks obtained by the operation to obtain a temporary block and then execute another step (not shown) to perform a function operation on the temporary block to obtain the checking vector. It should be appreciated that, the aforesaid function operation may be a key encrypting operation, a rotation operation, a hash operation or any other function operation on which an agreement has been reached in advance with the decryption side.

In addition to the aforesaid steps, the eighth embodiment can also execute all the operations and functions set forth in the first embodiment. How the eighth embodiment executes these operations and functions will be readily appreciated by those of ordinary skill in the art based on the explanation of the first embodiment, and thus will not be further described herein.

Figure 8A:
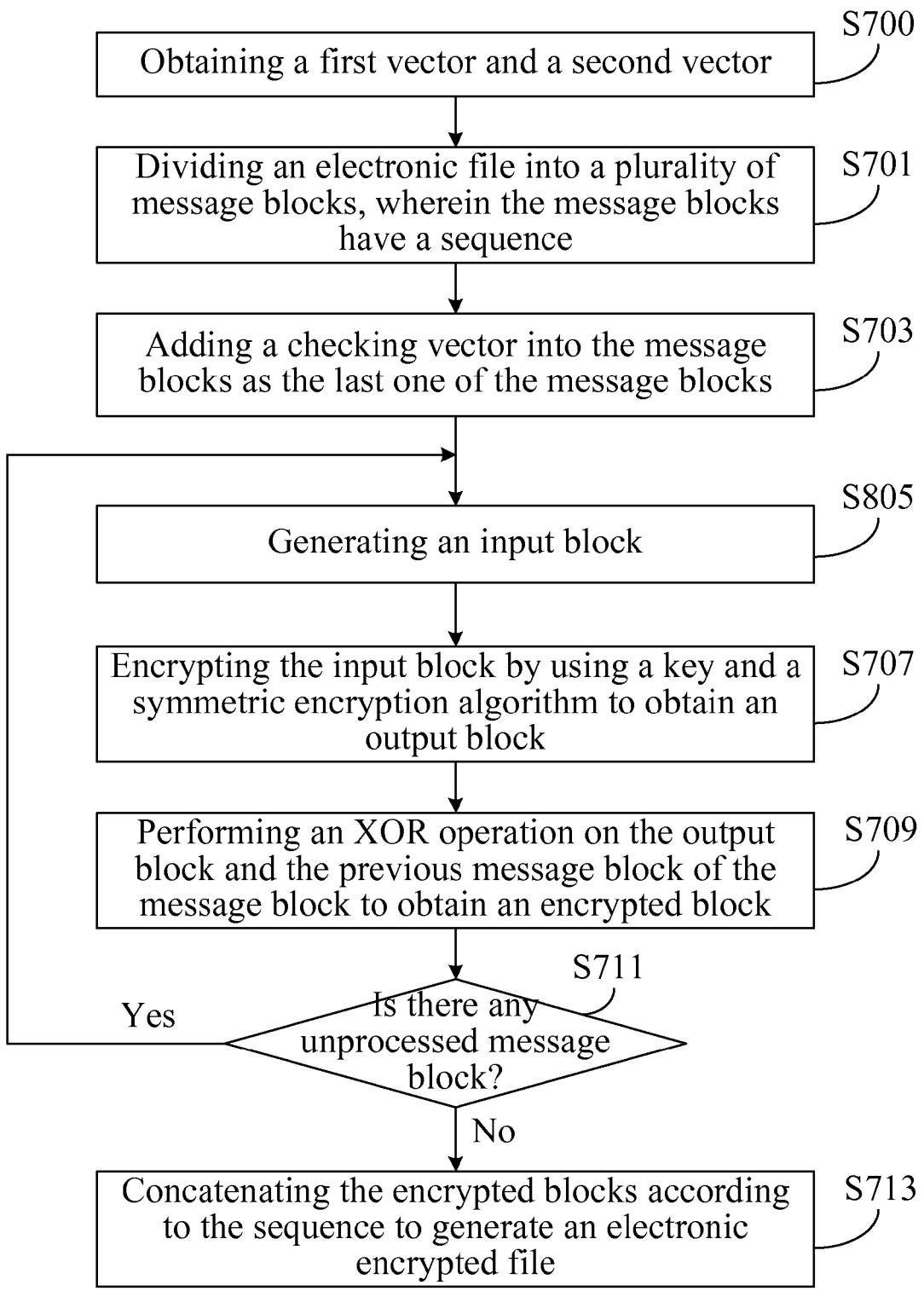
FIG. 8A is a flowchart diagram of a ninth embodiment of the present invention.

A ninth embodiment of the present invention is a computer-implemented block encryption method, a flowchart diagram of which is shown in FIG. 8A. The computer for implementing the block encryption method may be the aforesaid block encryption apparatus 2 and stored with a checking vector and a key. The operation principle of the ninth embodiment is the same as that of the second embodiment, so please refer to FIG. 3A together.

The block encryption method of the ninth embodiment executes steps S700, S701, S703, S805, S707, S709, S711 and S713. In other words, the ninth embodiment is different from the eighth embodiment in that, the step S705 is replaced with the step S805 in the ninth embodiment. Only differences between the two embodiments will be detailed hereinafter.

Firstly, the block encryption method of the ninth embodiment executes the steps S700, S701 and S703. Afterwards, the steps S805, S707, S709 and S711 are executed on each of the message blocks according to the sequence of the message blocks until all the message blocks are processed.

Specifically, in the step S805, an input block is generated. A value of the input block is equal to a value obtained by performing an XOR operation on the message block, an output block corresponding to a previous message block of the message block and a message block before the previous message block of the message block. In this embodiment, the step S805 performs an XOR operation on the message block and the message block before the previous message block of the message block to obtain a temporary block, and then performs an XOR operation on the temporary block and the output block corresponding to the previous message block of the message block to obtain the input block.

Then, in the step S707, the input block is encrypted by using a key and a symmetric encryption algorithm to obtain an output block. In the step S709, an XOR operation is performed on the output block and the previous message block of the message block to obtain an encrypted block. Further speaking, when the first one of the message blocks is processed in the steps S805 and S709, the output block corresponding to the previous message block of the message block is the first vector and the message block before the previous message block of the message block is an all-zero vector. When the second one of the message blocks is processed in the steps S805 and S709, the message block before the previous message block of the message block is the second vector.

Afterwards, in the step S711, it is determined whether there is any unprocessed message block. If the determination result of the step S711 is "yes", then the process goes back to the step S705 to continue to process the next message block. If the determination result of the step S711 is "no", it indicates that all the message blocks has been processed. Then, the step S713 is executed to concatenate the encrypted blocks according to the sequence to generate an electronic encrypted file.

Similarly, in other implementations, the computer for implementing the block encryption method may not be stored with the checking vector. The checking vector is generated as described in the previous embodiment, which will not be further described herein. Moreover, in addition to the aforesaid steps, the ninth embodiment can also execute all the operations and functions set forth in the second embodiment. How the ninth embodiment executes these operations and functions will be readily appreciated by those of ordinary skill in the art based on the explanation of the second embodiment, and thus will not be further described herein.

Figure 8B:
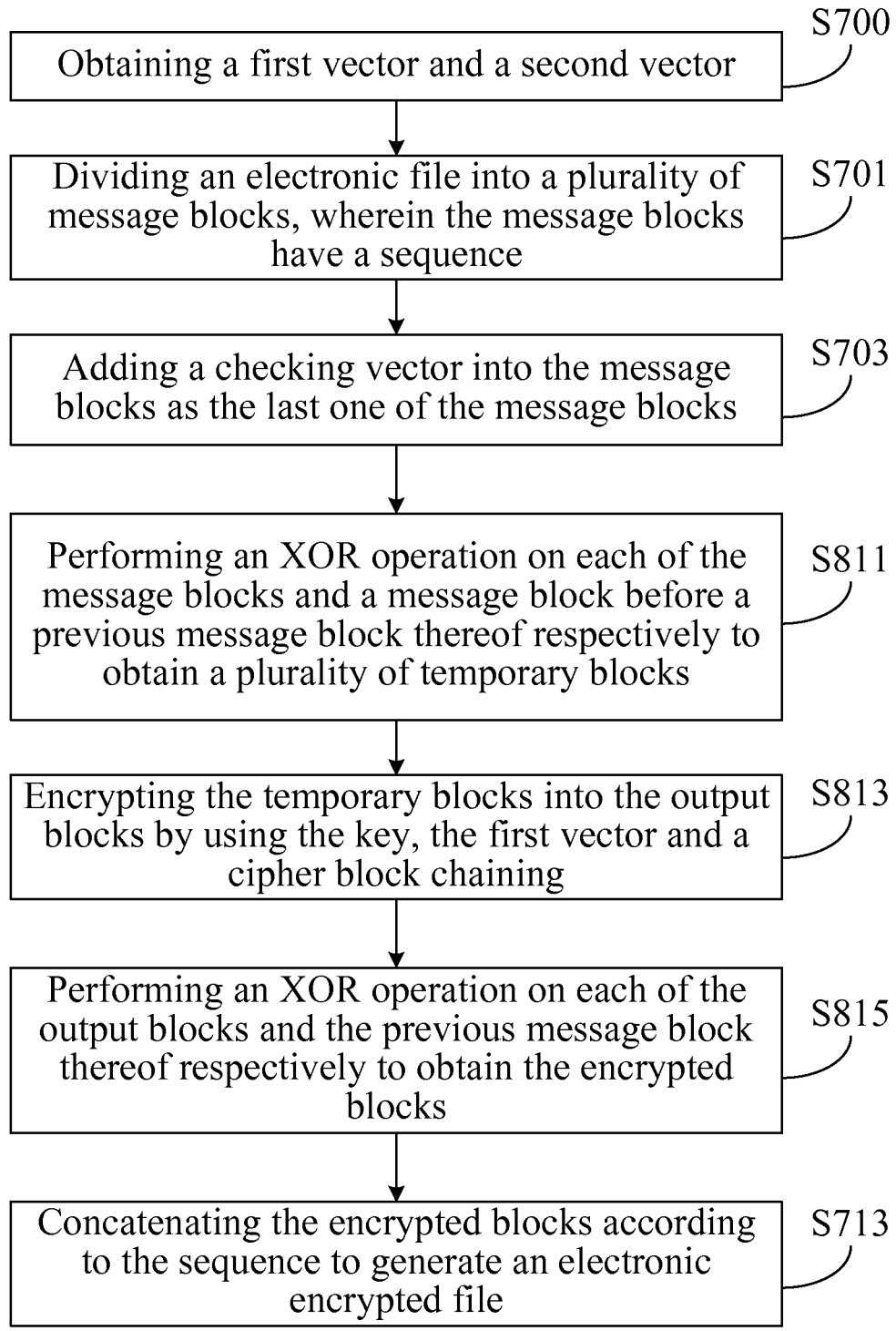
FIG. 8B is a flowchart diagram of a tenth embodiment of the present invention.

A tenth embodiment of the present invention is a computer-implemented block encryption method, a flowchart diagram of which is shown in FIG. 8B. The operation principle of the tenth embodiment is similar to that of the ninth embodiment except that some steps are accomplished by a conventional CBC in this embodiment. Only differences between the tenth embodiment and the ninth embodiment will be detailed hereinafter. Please refer to FIG. 3C together for ease of understanding.

Similarly, the block encryption method of this embodiment firstly executes the steps S700, S701 and S703. Then, step S811 is executed to perform an XOR operation on each of the message blocks and a message block before a previous message block thereof respectively to obtain a plurality of temporary blocks. It should be appreciated that, when the first one of the message blocks is processed in the step S811, the message block before the previous message block thereof is a full-zero vector. When the second one of the message blocks is processed in the step S811, the message block before the previous message block thereof is the second vector.

Then, step S813 is executed to encrypt the temporary blocks into the output blocks by using the key, the first vector and a CBC. Afterwards, step S815 is executed to perform an XOR operation on each of the output blocks and the previous message block thereof respectively to obtain the encrypted blocks. It should be appreciated that, when the first one of the output blocks is processed in the step S815, the previous message block thereof is the second vector. Afterwards, the step S713 is executed to concatenate the encrypted blocks according to the sequence to generate an electronic encrypted file.

Similarly, in other implementations, the computer for implementing the block encryption method may not be stored with the checking vector. The checking vector is generated as described in the eighth embodiment, which will not be further described herein. Moreover, in addition to the aforesaid steps, the tenth embodiment can also execute all the operations and functions set forth in the third embodiment. How the tenth embodiment executes these operations and functions will be readily appreciated by those of ordinary skill in the art based on the explanation of the third embodiment, and thus will not be further described herein.

Figure 9:
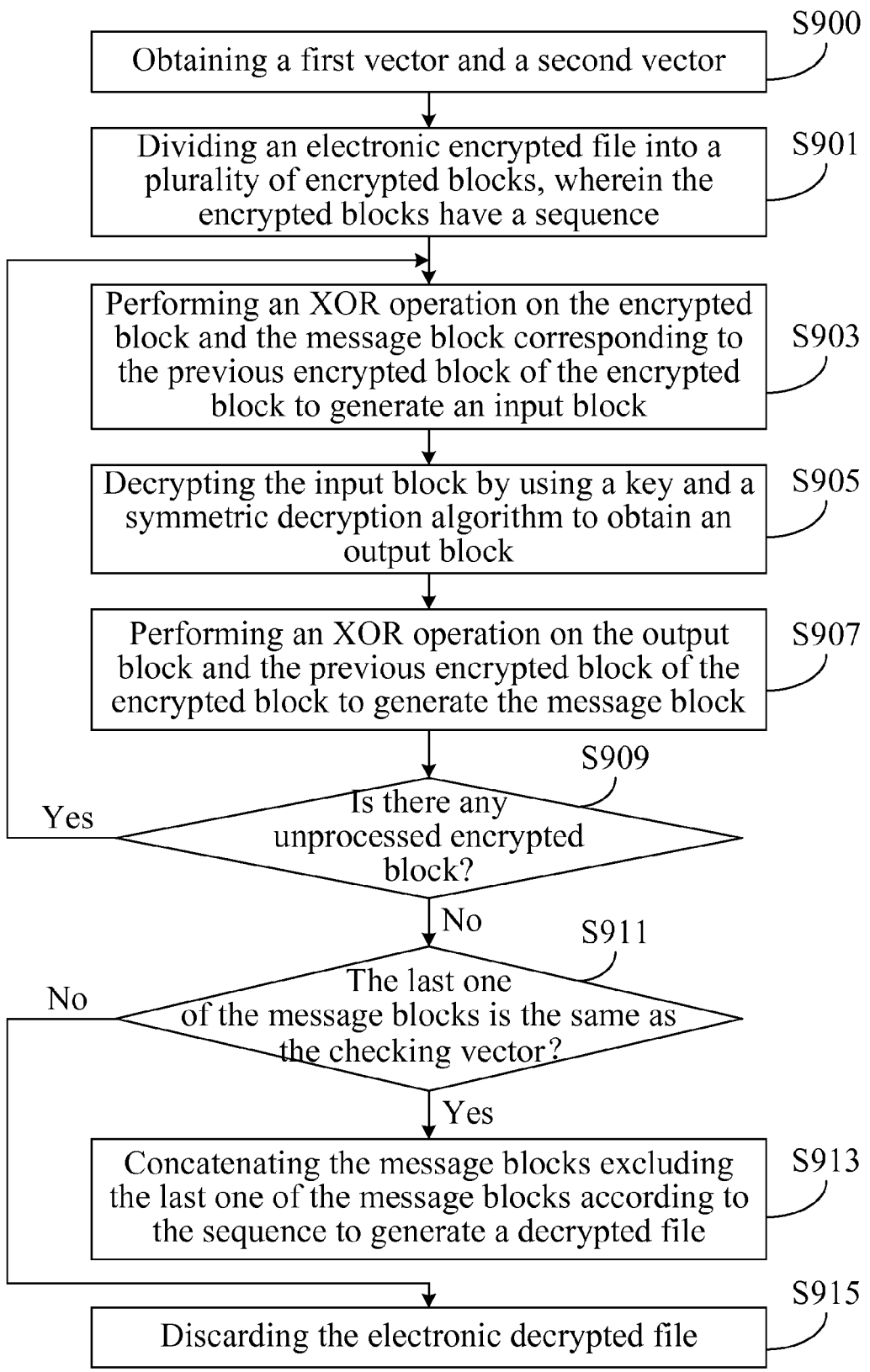
FIG. 9 is a flowchart diagram of an eleventh embodiment of the present invention.

An eleventh embodiment of the present invention is a computer-implemented block decryption method, a flowchart diagram of which is depicted in FIG. 9. The computer for implementing the block decryption method may be the aforesaid block decryption apparatus 4 and is stored with a checking vector and a key. Moreover, the block decryption method of this embodiment may be used together with the block encryption methods of the eighth to the tenth embodiments. In other words, the block decryption method of this embodiment can decrypt the electronic encrypted file encrypted in the eighth to the tenth embodiments. The operation principle of the eleventh embodiment is the same as that of the fourth embodiment, so please refer to FIG. 4B together.

Firstly, step S900 is executed to obtain a first vector and a second vector. It should be appreciated that, the first vector and the second vector obtained in the step S900 are the same as the first vector and the second vector used in the block encryption method for encrypting the electronic encrypted file. Afterwards, step S901 is executed to divide an electronic encrypted file into a plurality of encrypted blocks, and the encrypted blocks have a sequence. Then, steps S903, S905, S907 and S909 are executed on each of the encrypted blocks according to the sequence until all the encrypted blocks are processed.

Specifically, in the step S903, an input block is generated. A value of the input block is equal to a value obtained by performing an XOR operation on the encrypted block, an output block corresponding to a previous encrypted block of the encrypted block and an encrypted block before the previous encrypted block of the encrypted block. In this embodiment, the step S903 generates the input block by performing an XOR operation on the encrypted block and the message block corresponding to the previous encrypted block of the encrypted block. Then, in the step S905, the input block is decrypted by using a key and a symmetric decryption algorithm to obtain an output block. The symmetric decryption algorithm corresponds to the symmetric encryption algorithm used in the eighth to the tenth embodiments. In the step S907, a message block is generated. A value of the message block is equal to a value obtained by performing an XOR operation on the output block and the previous encrypted block of the encrypted block. In this embodiment, the step S907 generates the message block by performing an XOR operation on the output block and the previous encrypted block of the encrypted blocks. It should be appreciated that, when the first one of the encrypted blocks is processed in the steps S903 and S907, the output block corresponding to the previous encrypted block of the encrypted block is the second vector and the encrypted block before the previous encrypted block of the encrypted block is an all-zero vector. When the second one of the encrypted blocks is processed in the steps S903 and S907, the encrypted block before the previous encrypted block of the encrypted block is the first vector.

Afterwards, in the step S909, it is determined whether there is any unprocessed encrypted block. If the determination result of the step S909 is "yes", then the process goes back to the step S903 to continue to process the next encrypted block. If the determination result of the step S909 is "no", it indicates that all the encrypted blocks has been processed. Then, step S911 is executed to compare the last one of the message blocks with a checking vector and determine whether the last one of the message blocks is the same as the checking vector. If the determination result of the step S911 is "yes", then step S913 is executed to concatenate the message blocks excluding the last one of the message blocks according to the sequence to generate a decrypted file. If the determination result of the step S911 is "no", then step S915 is executed to discard the electronic encrypted file.

It should be appreciated that, if the block encryption method used together with this embodiment generates the checking vector dynamically by using the encrypted blocks generated rather than having the checking vector stored therein, this embodiment also needs to generate the checking vector in the same way. Specifically, after the step S901 is executed by the block decryption method, another step (not shown) may be executed to generate the checking vector by using the encrypted blocks excluding the last one of the encrypted blocks. The checking vector is generated as described in the previous embodiments, which will not be further described herein.

In addition to the aforesaid steps, the eleventh embodiment can also execute all the operations and functions set forth in the fourth embodiment. How the eleventh embodiment executes these operations and functions will be readily appreciated by those of ordinary skill in the art based on the explanation of the fourth embodiment, and thus will not be further described herein.

Figure 10:
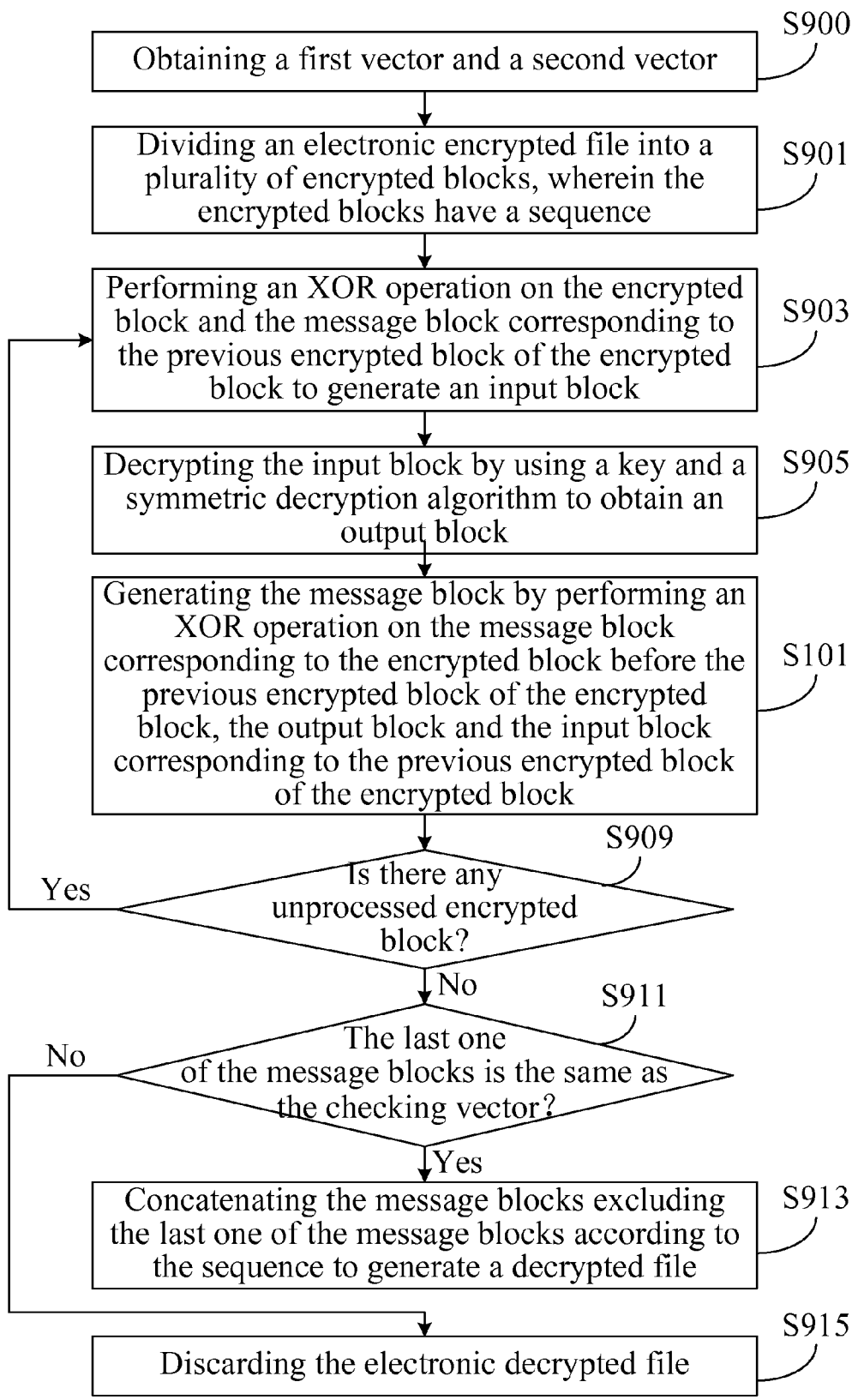
FIG. 10 is a flowchart diagram of a twelfth embodiment of the present invention.

A twelfth embodiment of the present invention is a computer-implemented block decryption method, a flowchart diagram of which is depicted in FIG. 10. The computer for implementing the block decryption method may be the aforesaid block decryption apparatus 4 and is stored with a checking vector and a key. Moreover, the block decryption method of this embodiment may be used together with the block encryption methods of the eighth to the tenth embodiments. In other words, the block decryption method of this embodiment can decrypt the electronic encrypted file encrypted in the eighth to the tenth embodiments. The operation principle of the twelfth embodiment is the same as that of the fifth embodiment, so please refer to FIG. 5A together.

The block decryption method of the twelfth embodiment executes steps S900, S901, S903, S905, S101, S909, S911, S913 and S915. In other words, this embodiment is different from the eleventh embodiment in that, the step S907 is replaced with the step S101 of this embodiment. Only differences between the twelfth embodiment and the eleventh embodiment will be detailed hereinafter.

Firstly, the step S900 is executed to obtain a first vector and a second vector. It should be appreciated that, the first vector and the second vector obtained in the step S900 are the same as the first vector and the second vector used in the block encryption method for encrypting the electronic encrypted file. Afterwards, the step S901 is executed to divide an electronic encrypted file into a plurality of encrypted blocks, and the encrypted blocks have a sequence. Then, the steps S903, S905 and S101 are executed on each of the encrypted blocks according to the sequence until all the encrypted blocks are processed.

In this embodiment, the step S101 is executed after the steps S903 and S905 are executed on each of the encrypted blocks. In the step S101, a message block is generated. A value of the message block is equal to a value obtained by performing an XOR operation on the output block and the previous encrypted block of the encrypted block. In this embodiment, the step S101 obtains the message block by performing an XOR operation on the message block corresponding to the encrypted block before the previous encrypted block of the encrypted block, the output block and the input block corresponding to the previous encrypted block of the encrypted block.

It should be appreciated that, when the first one of the encrypted blocks is processed in the step S101, the message block corresponding to the encrypted block before the previous encrypted block of the encrypted block is an all-zero vector and the input block corresponding to the previous encrypted block of the encrypted block is the first vector. Furthermore, when the second one of the encrypted blocks is processed in the step S101, the message block corresponding to the encrypted block before the previous encrypted block of the encrypted block is the second vector.

Then, the step S909 is executed. Similarly, after all the encrypted blocks are processed in the step S909, the process proceeds to steps S911 and S913 or steps S911 and S915.

Similarly, if the block encryption method used together with this embodiment generates the checking vector dynamically by using the encrypted blocks generated rather than having the checking vector stored therein, then this embodiment also needs to generate the checking vector in the same way. Specifically, after the step S901 is executed by the block decryption method, another step (not shown) may be executed to generate the checking vector by using the encrypted blocks excluding the last one of the encrypted blocks. The checking vector is generated as described in the aforesaid embodiments, which will not be further described herein.

In addition to the aforesaid steps, the twelfth embodiment can also execute all the operations and functions set forth in the fifth embodiment. How the twelfth embodiment executes these operations and functions will be readily appreciated by those of ordinary skill in the art based on the explanation of the fifth embodiment, and thus will not be further described herein.

Figure 11:
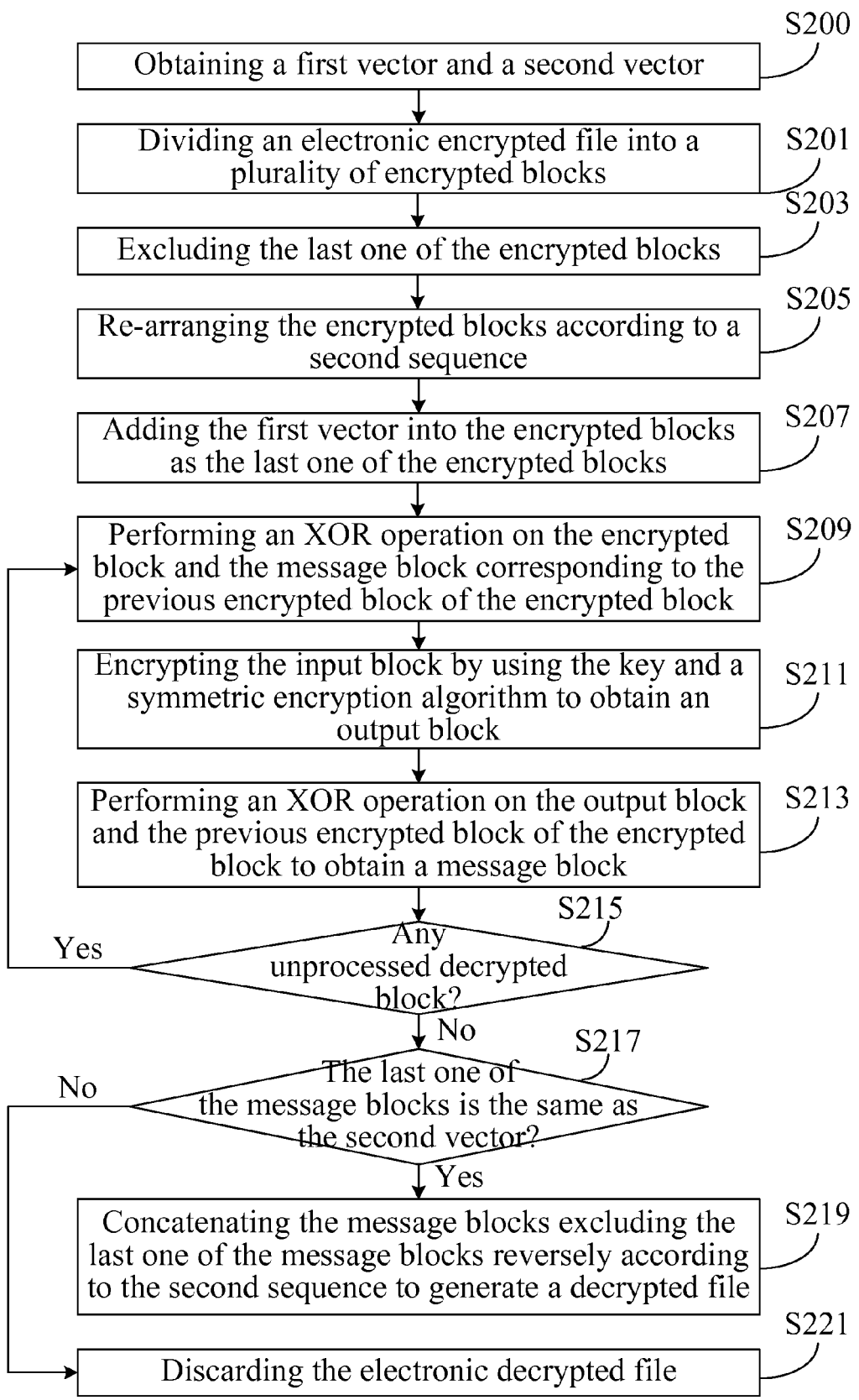
FIG. 11 is a flowchart diagram of a thirteenth embodiment of the present invention.

A thirteenth embodiment of the present invention is a computer-implemented block decryption method, a flowchart diagram of which is depicted in FIG. 11. The computer for implementing this block decryption method may be the aforesaid block decryption apparatus 4 and is stored with a checking vector and a key. Moreover, the block decryption method of this embodiment may be used together with the block encryption methods of the eighth to the tenth embodiments. In other words, the block decryption method of this embodiment can decrypt the electronic encrypted file encrypted in the eighth to the tenth embodiments. The operation principle of the thirteenth embodiment is the same as that of the sixth embodiment, so please refer to FIG. 6A together.

Firstly, the step S200 is executed to obtain a first vector and a second vector. It should be appreciated that, the first vector and the second vector obtained in the step S200 are the same as the first vector and the second vector used in the block encryption method for encrypting the electronic encrypted file. Afterwards, the step S201 is executed to divide an electronic encrypted file into a plurality of encrypted blocks which has a first sequence. The last one of the encrypted blocks is taken as a reference vector. Then, step S203 is executed to exclude the last one of the encrypted blocks. Then, in step S205, the encrypted blocks are re-arranged according to a second sequence which is reverse to the first sequence. In step S207, the first vector is added into the encrypted blocks as the last one of the encrypted blocks.

Then, steps S209, S211, S213 and S215 are executed on each of the encrypted blocks according to the second sequence until all the encrypted blocks are processed. In the step S209, an input block is generated. A value of the input block is equal to a value obtained by performing an XOR operation on the encrypted block, an output block corresponding to a previous encrypted block of the encrypted block, and an encrypted block before the previous encrypted block of the encrypted block. In this embodiment, the step S209 generates the input block by performing an XOR operation on the encrypted block and the message block corresponding to the previous encrypted block of the encrypted block. It should be appreciated that, when the first one of the encrypted blocks is processed in the step S209, the output block corresponding to the previous encrypted block of the encrypted block is the checking vector and the encrypted block before the previous block of the encrypted block is an all-zero vector. When the second one of the encrypted blocks is processed in the step S209, the encrypted block before the previous encrypted block of the encrypted block is the reference vector. Afterwards, in the step S211, the input block is encrypted by using the key and a symmetric encryption algorithm to obtain an output block. This symmetric encryption algorithm is the same as the symmetric encryption algorithm used in the eighth to the tenth embodiments. Then, in step S213, an XOR operation is performed on the output block and the previous encrypted block of the encrypted block to obtain a message block.

Afterwards, in the step S215, it is determined whether there is any unprocessed message block. If the determination result of the step S215 is "yes", then the process goes back to the step S209 to continue to process the next message block. If the determination result of the step S215 is "no", it indicates that all the message blocks has been processed, and the process proceeds to step S217 to compare the last one of the message blocks with the second vector and determine whether the last one of the message blocks is the same as the second vector. If the determination result of the step S217 is "yes", then step S219 is executed to exclude the last one of the message blocks and then concatenate the other message blocks reversely according to the second sequence to generate a decrypted file. If the determination result of the step S217 is "no", then step S221 is executed to discard the electronic encrypted file.

Similarly, if the block encryption method used together with this embodiment generates the checking vector dynamically by using the encrypted blocks generated rather than having the checking vector stored therein, then this embodiment also needs to generate the checking vector in the same way. Specifically, after the step S203 is executed by the decryption method, another step (not shown) may be executed to generate the checking vector by using the encrypted blocks. The checking vector is generated as described in the aforesaid embodiments, which will not be further described herein.

In addition to the aforesaid steps, the thirteenth embodiment can also execute all the operations and functions set forth in the sixth embodiment. How the thirteenth embodiment executes these operations and functions will be readily appreciated by those of ordinary skill in the art based on the explanation of the sixth embodiment, and thus will not be further described herein.

Figure 12:
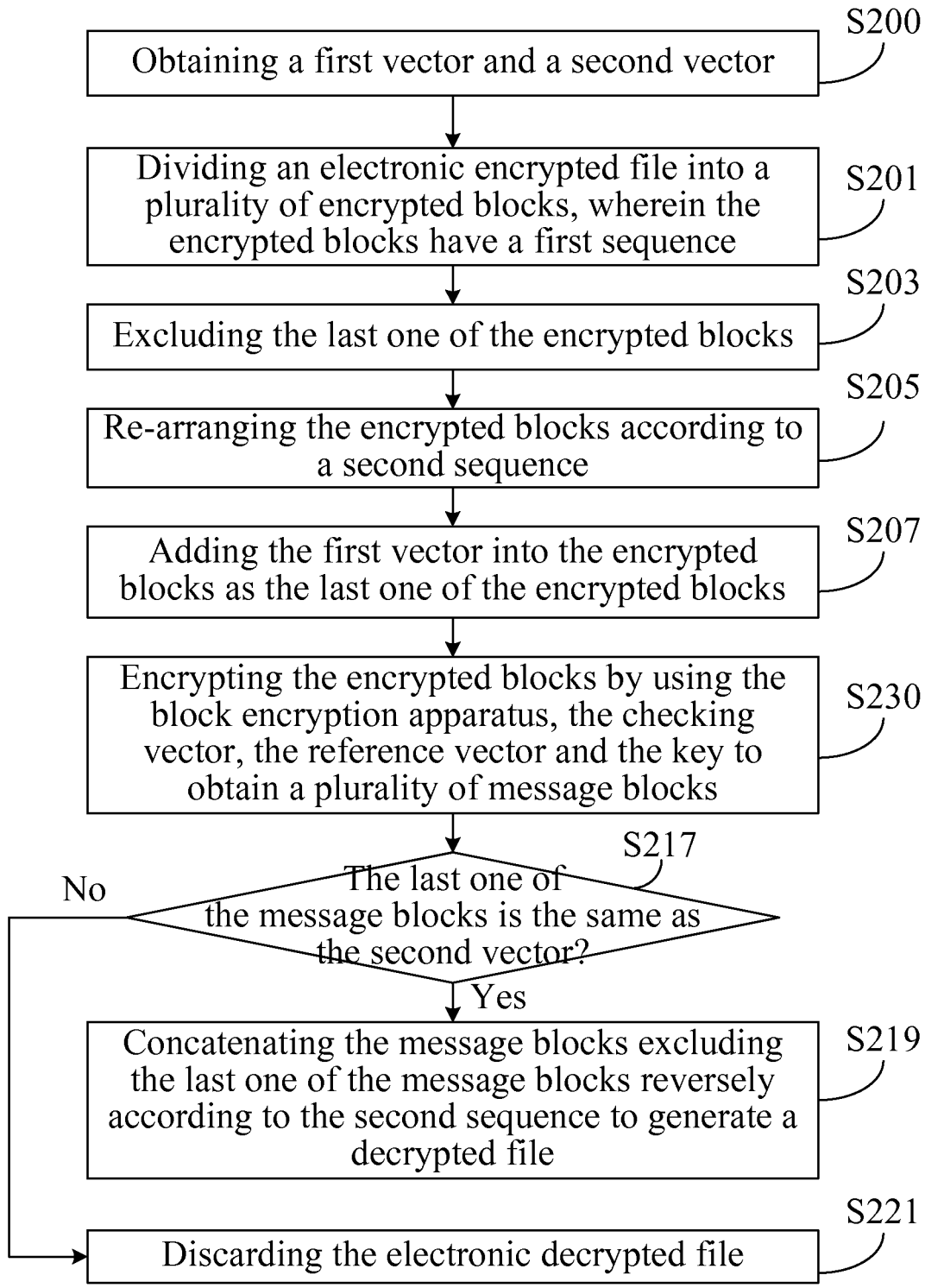
FIG. 12 is a flowchart diagram of a fourteenth embodiment of the present invention.

A fourteenth embodiment of the present invention is a computer-implemented block decryption method, a flowchart diagram of which is depicted in FIG. 12. The operation principle of the fourteenth embodiment is similar to that of the thirteenth embodiment except that some steps in this embodiment are accomplished by the block encryption apparatus of the present invention. Only differences between the fourteenth embodiment and the thirteenth embodiment will be detailed hereinafter. Please refer to FIG. 6C together for ease of understanding.

Similarly, the block decryption method of this embodiment firstly executes the steps S200, S201, S203, S205 and S207. Then, step S230 is executed to encrypt the encrypted blocks by using the block encryption apparatus, the checking vector, the reference vector and the key to obtain a plurality of message blocks. It should be appreciated that, when the step S230 is executed, the first vector and the second vector which would be input to the block encryption apparatus are replaced with the checking vector and the reference vector. Afterwards, steps S217 and S219 or steps S217 and S221 are executed.

As can be known by comparing FIG. 12 and FIG. 11, the steps S209, S211, S213 and S215 are replaced with the step S230. In other words, this embodiment only needs to adjust the data positions in order to achieve the decryption effect by using the block encryption apparatus.

Similarly, if the block encryption method used together with this embodiment generates the checking vector dynamically by using the encrypted blocks generated rather than having the checking vector stored therein, this embodiment also needs to generate the checking vector in the same way. Specifically, after the step S203 is executed by the decryption method, another step (not shown) may be executed to generate the checking vector by using the encrypted blocks. The checking vector is generated as described in the aforesaid embodiments, which will not be further described herein.

In addition to the aforesaid steps, the fourteenth embodiment can also execute all the operations and functions set forth in the seventh embodiment. How the fourteenth embodiment executes these operations and functions will be readily appreciated by those of ordinary skill in the art based on the explanation of the seventh embodiment, and thus will not be further described herein.

Moreover, the block encryption method and the block decryption method described in the eighth to the fourteenth embodiments can be implemented by a computer program product. When the computer program product is loaded into a processing unit and a plurality of codes comprised in the computer program product is executed, the block encryption method and the block decryption method described in any of the eighth to the fourteenth embodiments can be accomplished. The aforesaid computer program product may be a file that can be transmitted through a network, or may be stored in a tangible computer-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

As can be known from the descriptions of the embodiments, the block encryption apparatus and method of the present invention associate a plurality of message blocks comprised in the electronic file with a plurality of encrypted blocks comprised in the electronic encrypted file in multiple levels. In this way, if any one of the encrypted blocks of the electronic encrypted file is tampered (or is falsely transmitted), then the contents of the last one of the message blocks obtained by the decryption apparatus and method through decrypting the electronic encrypted file are false. As what the last one of the message blocks should be can be known, the decryption apparatus and method can be aware that the integrity of the electronic encrypted file has been damaged and thus discard the electronic encrypted file. Accordingly, the technology disclosed by the present invention can accomplish the encryption and the decryption efficiently without performing the message authentication code operation, while still satisfying the three basic security requirements of confidentiality, integrity and source authentication.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A computer-implemented block encryption method, comprising:
   (a) obtaining a first vector and a second vector;
   (b) dividing an electronic file into a plurality of message blocks, wherein the message blocks have a sequence;
   (c) adding a checking vector into the message blocks as the last one of the message blocks;
   (d) performing the following operations on each of the message blocks according to the sequence:
      (d1) generating an input block, wherein a value of the input block is equal to a value obtained by performing an XOR operation on the message block, an output block corresponding to a previous message block of the message block, and a message block before the previous message block of the message block;
      (d2) encrypting the input block by using a key to obtain an output block; and
      (d3) performing an XOR operation on the output block and the previous message block of the message block to obtain an encrypted block; and
   (e) concatenating the encrypted blocks according to the sequence to generate an electronic encrypted file,
   wherein the output block corresponding to the previous message block of the message block is the first vector and the message block before the previous message block of the message block is an all-zero vector when the step (d) processes the first one of the message blocks,
   wherein the message block before the previous message block of the message block is the second vector when the step (d) processes the second one of the message blocks.

2. The block encryption method as claimed in claim 1, wherein the step (d1) generates the input block by performing an XOR operation on the message block and the encrypted block corresponding to the previous message block of the message block.

3. The block encryption method as claimed in claim 1, wherein the step (d1) comprises:
   performing an XOR operation on the message block and the message block before the previous message block of the message block to obtain a temporary block, and
   performing an XOR operation on the temporary block and the output block corresponding to the previous message block of the message block to obtain the input block.

4. The block encryption method as claimed in claim 1, wherein the step (d1), the step (d2), and the step (d3) include the following steps:
   obtaining a plurality of temporary blocks by performing the following operation on each of the message blocks:
      performing an XOR operation on the message block and the message block before the previous message block of the message block;
   encrypting the temporary blocks into the output blocks by using the key, the first vector and a cipher block chaining device; and
   performing an XOR operation on each of the output blocks and the corresponding previous message block to obtain the encrypted blocks.

5. The block encryption method as claimed in claim 1, further comprising:
   performing an XOR operation on the encrypted blocks to obtain a temporary block before processing the last one of the message blocks; and
   performing a function operation on the temporary block to obtain the checking vector.

6. The block encryption method as claimed in claim 1, wherein the function operation is one of a key encrypting operation, a rotation operation and a hash operation.

7. A computer-implemented block decryption method, comprising:
   (a) obtaining a first vector and a second vector,
   (b) dividing an electronic encrypted file into a plurality of encrypted blocks, wherein the encrypted blocks have a sequence,
   (c) performing the following operations on each of the encrypted blocks according to the sequence:
      (c1) generating an input block, wherein a value of the input block is equal to a value obtained by performing an XOR operation on the encrypted block, an output block corresponding to a previous encrypted block of the encrypted block and an encrypted block before the previous encrypted block of the encrypted block,
      (c2) decrypting the input block by using a key to obtain an output block, and
      (c3) generating a message block, wherein a value of the message block is equal to a value obtained by performing an XOR operation on the output block and the previous encrypted block of the encrypted block,
   (d) comparing the last one of the message blocks with a checking vector, and
   (e) concatenating the message blocks excluding the last one of the message blocks according to the sequence to generate a decrypted file when the last one of the message blocks is the same as the checking vector,
   wherein the output block corresponding to the previous encrypted block of the encrypted block is the second vector and the encrypted block before the previous encrypted block of the encrypted block is an all-zero vector when the step (c) processes the first one of the encrypted blocks, and the encrypted block before the previous encrypted block of the encrypted block is the first vector when the step (c) processes the second one of the encrypted blocks.

8. The block decryption method as claimed in claim 7, wherein the step (c1) generates the input block by performing an XOR operation on the encrypted block and the message block corresponding to the previous encrypted block of the encrypted block, and the step (c3) generates the message block by performing an XOR operation on the output block and the previous encrypted block of the encrypted block.

9. The block decryption method as claimed in claim 7, wherein the step (c1) generates the input block by performing an XOR operation on the encrypted block and the message block corresponding to the previous encrypted block of the encrypted block, and the step (c3) obtains the message block by performing an XOR operation on the message block corresponding to the encrypted block before the previous encrypted block of the encrypted block, the output block and the input block corresponding to the previous encrypted block of the encrypted block, and wherein the message block corresponding to the encrypted block before the previous encrypted block of the encrypted block is an all-zero vector and the input block corresponding to the previous encrypted block of the encrypted block is the first vector when the step (c3) processes the first one of the encrypted blocks, and the message block corresponding to the encrypted block before the previous encrypted block of the encrypted block is the second vector when the step (c3) processes the second one of the encrypted blocks.

10. The block decryption method as claimed in claim 7, further comprising:

performing an XOR operation on the encrypted blocks excluding the last one of the encrypted blocks to obtain a temporary block, and performing a function operation on the temporary block to obtain the checking vector.

11. The block decryption method as claimed in claim 10, wherein the function operation is one of a key encrypting operation, a rotation operation and a hash operation.

12. A computer-implemented block decryption method, comprising:
(f) obtaining a first vector and a second vector,
(g) dividing an electronic encrypted file into a plurality of encrypted blocks, wherein the encrypted blocks have a first sequence and the last one of the encrypted blocks is a reference vector,
(h) excluding the last one of the encrypted blocks,
(i) re-arranging the encrypted blocks according to a second sequence after the step (h), wherein the second sequence is reverse to the first sequence,
(j) adding the first vector into the encrypted blocks as the last one of the encrypted blocks,
(k) performing the following operations on each of the encrypted blocks according to the second sequence:
(k1) generating an input block, wherein a value of the input block is equal to a value obtained by performing an XOR operation on the encrypted block, an output block corresponding to a previous encrypted block of the encrypted block, and an encrypted block before the previous encrypted block of the encrypted block,
(k2) encrypting the input block by using a key to obtain an output block, and
(k3) generating a message block by performing an XOR operation on the output block and the previous encrypted block of the encrypted block,
(l) comparing the last one of the message blocks with the second vector, and
(m) when the last one of the message blocks is the same as the second vector, excluding the last one of the message blocks and then concatenating the other message blocks according to the second sequence to generate a decrypted file,
wherein the output block corresponding to the previous encrypted block of the encrypted block is the checking vector and the encrypted block before the previous block of the encrypted block is an all-zero vector when the step (k1) processes the first one of the encrypted blocks, and the encrypted block before the previous encrypted block of the encrypted block is the reference vector when the step (k1) processes the second one of the encrypted blocks.

13. The block decryption method as claimed in claim 12, wherein the step (k1) generates the input block by performing an XOR operation on the encrypted block and the message block corresponding to the previous encrypted block of the encrypted block.

14. The block decryption method as claimed in claim 12, further comprising:
performing an XOR operation on the encrypted blocks excluding the last one of the encrypted blocks to obtain a temporary block after the step (g); and
performing a function operation on the temporary block to obtain the checking vector.

15. The block decryption method as claimed in claim 14, wherein the function operation is one of a key encrypting operation, a rotation operation and a hash operation.

16. The block decryption method as claimed in claim 12, wherein the step (k1), the step (k2) and the step (k3) of the step (k) include the following steps:
(n1) using the encrypted blocks, the checking vector, the reference vector and the key as the message blocks, the first vector, the second vector and the key respectively used in the operation (d) performed by the block encryption apparatus as claimed in claim 1, and
(n2) performing the operation (d) as claimed in claimed 1 by using the block encryption apparatus as claimed in claim 1 to obtain the message blocks.

* * * * *